(12) United States Patent
Friedman

(10) Patent No.: US 11,148,056 B1
(45) Date of Patent: Oct. 19, 2021

(54) UTILIZATION OF SKILL IN A VIDEO WAGERING GAME

(71) Applicant: Next Gaming, LLC, North Las Vegas, NV (US)

(72) Inventor: Stacy Friedman, Lake Oswego, OR (US)

(73) Assignee: Next Gaming, LLC, Las Vegas, NV (US)

( * ) Notice: Subject to any disclaimer, the term of this patent is extended or adjusted under 35 U.S.C. 154(b) by 0 days.

(21) Appl. No.: 16/051,382

(22) Filed: Jul. 31, 2018

Related U.S. Application Data

(60) Provisional application No. 62/702,892, filed on Jul. 24, 2018, provisional application No. 62/712,165, filed on Jul. 30, 2018.

(51) Int. Cl.
*A63F 13/67* (2014.01)
*A63F 13/50* (2014.01)

(52) U.S. Cl.
CPC .............. *A63F 13/67* (2014.09); *A63F 13/50* (2014.09)

(58) Field of Classification Search
CPC ............. G07F 17/3262; G07F 17/3295; A07F 17/3244
See application file for complete search history.

(56) References Cited

U.S. PATENT DOCUMENTS

| | | | |
|---|---|---|---|
| 7,682,239 B2 | 3/2010 | Friedman | |
| 2005/0192087 A1 | 9/2005 | Friedman | |
| 2011/0118011 A1 | 5/2011 | Filipour | |
| 2011/0263312 A1* | 10/2011 | De Waal | A63F 7/02 463/20 |
| 2013/0237313 A1 | 9/2013 | Filipour | |
| 2016/0055712 A1 | 2/2016 | Arnone | |
| 2019/0030434 A1* | 1/2019 | Perez | A63F 13/537 |
| 2019/0147706 A1* | 5/2019 | Bolling, Jr. | G07F 17/3295 463/2 |
| 2020/0005587 A1 | 1/2020 | Hartl | |

* cited by examiner

*Primary Examiner* — William H McCulloch, Jr.
*Assistant Examiner* — Ankit B Doshi
(74) *Attorney, Agent, or Firm* — Muskin and Farmer LLC

(57) ABSTRACT

A method, system, and computer readable storage to implement a skill based video game wagering system. Different video games can be implemented, and within each video game, a player's skill can affect the award model that is initiated when the player takes an action to earn an award (e.g., successfully destroying a target). Upon each award model being initiated, a credit cost is deducted from the player's credit meter, and then award model is activated which can generate an award, or a value of zero which is a loss for the player.

14 Claims, 22 Drawing Sheets

UTILIZATION OF SKILL IN A VIDEO WAGERING GAME

CROSS REFERENCE TO RELATED APPLICATIONS

This application claims benefit to both U.S. provisional applications 62/702,892 and 62/712,165 both of which are incorporated by reference herein in their entireties.

BACKGROUND OF THE INVENTION

Field of the Invention

The present general inventive concept is directed to a method, apparatus, and computer readable storage medium directed to utilizing skill in a video wagering game.

Description of the Related Art

Video games are well known in the art, and allow a player to play an interactive game implemented by a computer which typically has the player trying to attempt a goal while the game-play is updated using computer animation. Such games include a "brick breaker" type game, which enables a player to move a paddle left/right and deflect a ball to hit bricks displayed in an arrangement on the screen. Each time the ball hits a brick, the brick would disappear, and the player would get points. If the player causes all the bricks in the arrangement to disappear, the player has "cleared" the level and may proceed to the next. There are known examples of the "brick breaker" game genre as described in this prior art section.

Another type of known video game is a shooter type game. A shooter type game is where a player can move around a launcher (e.g., a player space ship) and shoot a weapon (e.g., a missile). If the missile hits an enemy target (such as an alien, etc.) the player would get points. If the aliens shoot missiles back at the launcher they can destroy it. The player would typically get a finite number of launchers (such as three) and when all launchers are destroyed the player's game would then end. There are known examples of the "shooter" genre as described in this prior art section.

A further type of known game is a balloon-popping type game. A player can aim a launcher (which may be shaped like a cannon, a gun, a harpoon, a slingshot, an animal, an arrow, etc.) at a bottom of the game screen in any direction and press a button to launch a balloon. There are a set of colored balloons (many with the same color) in an arrangement on the screen. The player launches a balloon at the arrangement, and when the player's balloon leads to three (or according to game rules, 4, 5, or 6, or more) adjacent like-colored balloons (a "group"), those like-colored balloons will pop (pops) and disappear any other balloons now isolated by the pops (not touching other balloons) will now drop down (drops). The player would shoot his/her balloon towards other balloons of the same color in order to generate a set of three or more adjacent like-colored balloons to pop, and thereby also drop any isolated balloons after the popped balloons disappear. The more balloons the player pops and drops, the more points the player gets. The game can be scored by awarding (adding to the score meter) **10\*P points wherein P=the number of popped balloons (balloons are synonymous with "bubbles") and the player can also be awarded 10\*2^D** wherein D=the number of dropped balloons. There are known examples of balloon-popping games as described in this prior art section.

In a typical balloon-popping game, balloons in the arrangement are directly "connected" to other adjacent balloons, or alternately to an upper border of the arrangement (e.g., the ceiling.) Balloons may be arranged into any structure, and along any type of grid (e.g., a square grid, a hexagonal grid). An unpopped balloon will remain in the arrangement so long as it is connected, via one or more sequentially connected balloons, to the ceiling. If one or more balloons are popped that are the last remaining connection(s) to the ceiling for a set of balloons, those balloons will have become disconnected (suspended) from the ceiling and will fall down. Such falling balloons are known as dropped balloons or "drops." As long as a balloon is connected to the ceiling (by virtue of a being connected to the ceiling via touching a chain/group of adjacent balloons of any color), it will remain in its original place regardless of whether any adjacent or nearby balloons are popped. Thus, it is possible for a balloon to remain in place while surrounding balloons have been removed. When a balloon(s) is popped, either as a result of a like-color match or as a result of a special balloon effect, any balloons relying on that popped balloon(s) for their connection to the ceiling will drop. A connection to the ceiling is a chain/group of touching (adjacent) balloons reaching the ceiling regardless of the colors of balloons in the chain. In many balloon-popping games, the player's score increases significantly (e.g., exponentially) as the number of dropped balloons for a given shot increases. Thus, a skilled strategy is to "hang" multiple unlike balloons underneath a set of two like-colored balloons so those unlike balloons are not otherwise connected to the ceiling. Then, when the like-colored balloon appears in the launcher, aim for the two like-colored balloons to make a matching set of three balloons. The three balloons will pop and all the balloons that had been previously hung or suspended by the player will now drop, leading to a high-scoring play.

Another type of know game is a boulder-shooting (or boulder destroy) type game. In this game, free flying targets (such as boulders) fly around the screen. Typically, there is no border on the screen so when a target falls off one side of the screen it "wraps" or appears on the opposite side of the screen. A player-controlled ship can be controlled by the player rotating the ship clockwise or counterclockwise and then pressing a thrust button which propels the ship forward. The player's ship also wraps such that if it flies off one edge of the screen, it reappears on the opposite edge. The player can shoot the boulders (or other targets) which, when hit, would break into multiple smaller boulders until a smallest size boulder is hit which would then disappear from the game screen. If the ship collides with any of the boulders the ship would be destroyed. Typically, the player gets a finite number of ships (lives) such as three before his/her game is over. There are known examples of the boulder-shooting game as described in this prior art section.

In a prior-art non-wagering video game, the player would typically pay money (e.g., $0.25) to play a game but there would be no wagering involved, and when the player loses all of his/her lives the game is over.

SUMMARY OF THE INVENTION

It is an aspect of the present invention to enable skill to affect outcomes of a video game.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
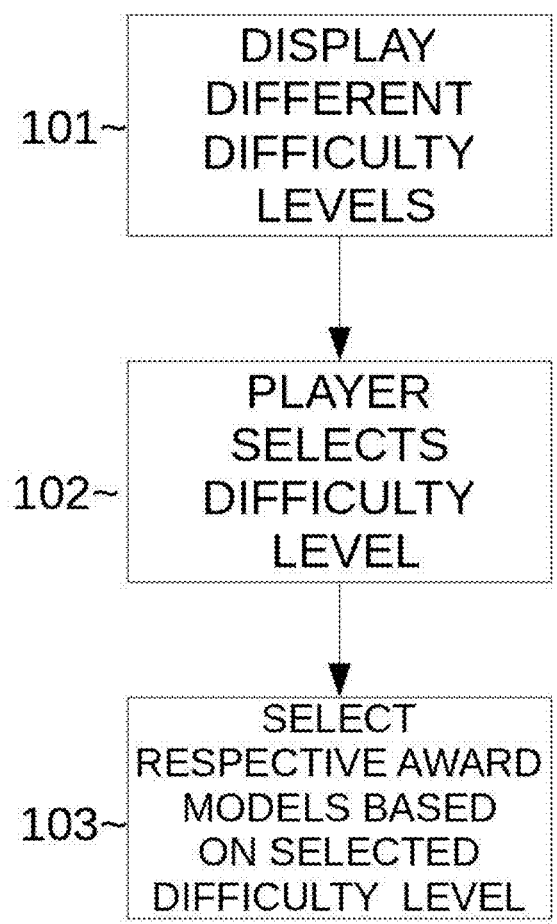
FIG. 1 is a flowchart illustrating an exemplary method of selecting a difficulty level and determining a set of award models, according to an embodiment.

Reference will now be made in detail to the presently preferred embodiments of the invention, examples of which are illustrated in the accompanying drawings, wherein like reference numerals refer to like elements throughout.

Wagering on video games is known, for example see US patent publication 20050192087 which is incorporated by reference herein in its entirety. Said publication describes numerous embodiments, including how an award model can be initiated upon a destruction of a target. For example, if a target (e.g., brick, alien, etc.) is destroyed (an award generating event), then an award model is initiated which may (but is not required to) generate an award, and a deduction of credit(s) from the player's credit meter is also performed in order to pay for the award model. For example, each time an alien is killed, the player's credit meter is deducted by 1 credit (in other words the kill cost the player one credit) but then an award model is initiated which uses a mathematical model which determines an award to award the player. In this manner, each kill cost the player a credit but then also initiates an award model which may provide the player an award. No kills would result in no credits being deducted and no awards being generated.

This paradigm can be augmented with a system which rewards the player for being more skilled. Thus, a more skilled player may get a better (higher expected value) award model than an award model that an unskilled player may get.

Initially, the player may select a difficulty level. The player, on his own accord, can select from a plurality of difficulty levels, such as "Easy", "Medium", and "Hard." Each difficulty level would have its own set of award models with its own properties (e.g., return to player (RTP), variance, etc.)

Table I below is a table showing an exemplary set of difficulty levels and respective attributes. Each row represents an individual award model (which is a mathematical model) that is used to determine whether the player wins an award (and if so how much). For example, an award model could be a random selection (with equal probability) from the set of {0, 1, 2} which means the player has a possibility of receiving no (zero) award. The expected award of this example award model would be 1 (the average of all three awards). If each time this award model was activated cost the player 1 credit, then the return to player of this award model would be 100% (no house advantage). Note that an expected award can be computed as the RTP multiplied by the denomination bet.

TABLE I

| Model | RTP | Variance | Top Award |
| --- | --- | --- | --- |
| Easy1 | 87.00% | 5 | 25 |
| Easy2 | 89.00% | 8 | 100 |
| Easy3 | 91.00% | 12 | 250 |
| Medium1 | 88.50% | 5 | 25 |
| Medium2 | 90.50% | 8 | 100 |
| Medium3 | 92.50% | 12 | 250 |

TABLE I-continued

| Model | RTP | Variance | Top Award |
|---|---|---|---|
| Hard1 | 90.00% | 5.5 | 25 |
| Hard2 | 92.00% | 8.5 | 100 |
| Hard3 | 94.00% | 13 | 250 |

In Table I, "RTP" stands for return to player and represents the player's theoretical return for that game (e.g., 100% would represent a "fair game" for the player with no house advantage). Variance represents the variance of the award model. Top Award represents that award model's top (highest) award. Note that all of the different award models can all be different models meaning that in the long run, the awards generated (and their distribution) from each different model would not converge and be identical. In other words, the mathematical definition/specification for each model is different and would produce different results in the long run. The result of activating a particular award model is random (utilizing a random number generator), therefore in the long run an award model (e.g., "Hard3" with a RTP of 94%) with a relatively higher RTP should return more in the long run than an award model with a lower RTP (e.g., "Hard2" with a RTP of 92%). However, this does not mean that Hard3 will always return a higher award than Hard2, and of course given a first award model with a higher RTP than a second award model, the second award model can still return an award higher than the first award model since outcomes are still random.

If the player selects "Easy" as his/her difficulty level for a game, then all award models that the player would experience in the game would potentially vary among Easy1, Easy2, and Easy3. If the player selects "Medium" as his/her difficulty level for a game, then all award models that the player would experience in the game would potentially vary among Medium1, Medium2, Medium3. If the player selects "Hard" as his/her difficulty level for a game, then all award models that the player would experience in the game would potentially vary among Hard1, Hard2, Hard3. In other words, if the player picked "Easy" as the difficulty level, the award model may start with Easy1, but could change to Easy2 or Easy3 and perhaps back to Easy1 depending on events in the game. The game will select which model will be used from within a given difficulty level based on an evaluation of a player's skill factor as will be described hereinbelow.

In the example in Table I, a player who achieves the highest skill factor on the Easy difficulty level has an RTP of 91%, while a player who struggles playing at the Hard difficulty level and cannot surpass the lowest skill factor has a lower RTP of 90%. Thus, if the player is aware of the RTP and the details of how the skill factor is assessed by the game (as described below), that player can influence their overall RTP by selecting a difficulty level that corresponds to their ability.

Table II below is a table illustrating which award models would be utilized for each particular difficulty level. Note that while three discrete difficulty levels are used in this example, it can be appreciated that any other number of difficulty levels can be utilized as well (e.g., 2 to 10). Also note that in an embodiment, utilizing the difficulty level is optional and all games could operate under a single pre-defined difficulty level.

TABLE II

| Difficulty level | Award Model Set |
|---|---|
| Easy | Easy1, Easy2, Easy3 |
| Medium | Medium1, Medium2, Medium3 |
| Hard | Hard1, Hard2, Hard3 |

Typically, once a difficulty level is chosen for a game, the difficulty level would not be changed (and hence the award model set) during the entirety of that game. In an alternate embodiment, the player would be able to change the skill level during a game. Of course, once a new game is initiated, a new difficulty level can be selected by the player.

An award model is a mathematical paradigm for generating an award in the game. Note that an award model could potentially generate an award of zero, which means the player does not win an award and would lose the cost to initiate the award model. Award models can be defined in numerous ways. For example, a list of potential awards can be provided along with a probability of winning each of the potential awards.

TABLE III

| Award | Frequency | Probability |
|---|---|---|
| 100 | 1 | 0.000211193 |
| 75 | 1 | 0.000211193 |
| 50 | 3 | 0.00063358 |
| 25 | 5 | 0.001055966 |
| 20 | 4 | 0.000844773 |
| 15 | 6 | 0.001267159 |
| 10 | 11 | 0.002323126 |
| 5 | 72 | 0.015205913 |
| 3 | 280 | 0.059134108 |
| 2 | 531 | 0.112143611 |
| 1 | 1293 | 0.273072862 |
| 0 | 2528 | 0.533896515 |

Table III is an example of a list of potential awards (from 0 to 100) and their corresponding probabilities. In Table III, the listed probabilities are calculated as the listed frequency divided by the sum of all frequencies (which is 4735 in Table III). For this example model, a gaming mathematician would understand how to calculate the RTP (which is 90.50%) and the variance (which is 8). As such this model corresponds to the description of Medium2 in Table I. Of course, many other mathematical models could also correspond to the description of Medium2, and such models may be specified using techniques other than the simple list of awards and probabilities as described above. For instance, slot machine math models tend to use a more complicated method involving the probabilities of multiple symbols forming predetermined winning combinations. Unlike the award model in Table III, which requires simply selecting from the list of awards according to the listed probabilities, slot machine games typically require an evaluation of multiple symbols across multiple reels to determine the award outcome. The embodiments described herein will function regardless of the underlying details of the award generation process, however. It is thus possible to use the award models and award generation processes from slot machine games (or other known games) in the embodiments herein.

An additional quantity known as the skill factor is also used to determine which award model is utilized. The skill factor is evaluated by the game and can change (can increase or decrease) over time as the game is played. In general, the concept is that the more skill a player exhibits, the better (higher expected value or return to player) the award model the player receives should be. As such, the skill factor is a quantity that can change as the player plays the game with the player preferring to increase the skill factor so that the player would receive a preferred award model. The player typically would not know the current skill factor although in an embodiment the current skill factor could be displayed to the player.

Table IV below illustrates one example of how the skill factor would map into an award model which would be used for the next award generation. An award generating event is an event in the game which triggers an award model to be activated. For example, an award generating event could be triggered when the player destroys a target, catches a target, maneuvers an icon a certain way, etc. Each time an award generating event occurs, an award generation sequence initiates. An award generation sequence comprises deducting an amount of credits (typically a predetermined amount such as the denomination selected by the player at the beginning of the game). In other words, if the player chose $0.02 (two cents) as the credit cost (amount deducted for each award generating event/sequence), then each time an award generating event occurs the player's credit meter is deducted $0.02 which pays for any potential award the player may win for that award generating event. The credit cost is deducted from the player's credit meter and then a particular award model is activated to generate an award result, and then the award result is added to the player's credit meter (if the award result is zero then there is no award and the award sequence results in a net loss for the player).

Note that in one embodiment, all award generating events in the game have the same credit cost which was selected at the beginning of the game by the player. In an alternative embodiment, different award generating events could have different credit costs which typically (but not necessarily) would all be multiples of the selected credit cost. For example, if the player selected a credit cost (also referred to as denomination) of $0.05, then while some award generating events would cost the player $0.05, other award generating events could have a credit cost of $0.10, $0.15, etc.

TABLE IV

| Skill factor | award model |
|---|---|
| 0 | 1 |
| 1 | 1 |
| 2 | 1 |
| 3 | 2 |
| 4 | 2 |
| 5 | 2 |
| 6 or more (>=6) | 3 |

Note that the award models listed in Table IV apply to the current difficulty level being used. For example, if the difficulty level selected is Easy, then award model 1 means that award model Easy1 is used, award model 2 means that award model Easy2 is used, and award model 3 means that award model Easy3 is used. Similarly, if the difficulty level selected is Medium, then award model 1 means that award model Medium1 is used, award model 2 means that award model Medium2 is used, award model 3 means that award model Medium3 is used. If the difficulty level selected is Hard, then award model 1 means that award model Hard1 is used, award model 2 means that award model Hard2 is used, award model 3 means that award model Hard3 is used. Note that any number of difficulty levels could be used and this paradigm would be applied accordingly.

FIG. 1 is a flowchart illustrating an exemplary method of selecting a difficulty level and determining a set of award models, according to an embodiment.

The method can begin with operation 100, wherein the player is presented with a set of difficulty levels the play can choose from. This can be done by presenting (displaying) the player with a number of icons (or other indicia) representing different difficulty levels.

From operation 100, the method proceeds to operation 101, wherein the player selects one of the difficulty levels. This can be done by touching the appropriate icon (using a touch-screen), or pressing a button on the machine, or using a joystick, trackball, or wheel to navigate to the desired option, or via any other input device.

From operation 101, the method would proceed to operation 102, which would select (utilize) the respective award models based on (mapped to) the difficulty level selected by the player in operation 101. This can be done at any point in time during game-play and need not be a discrete step immediately following operation 101. During the game, only award models from the set of award models for the selected difficulty level (selected in operation 101) will be used. In some embodiments, the player may change the difficulty level during game play.

In operations 101-102, or in an independent method that may be carried out approximately at the same time as the method of selecting a difficulty level, the player can also be presented with a plurality of credit costs and the player can select which credit cost will be applicable throughout the entire game. The credit cost is the amount the player has to pay (will be deducted from the player's credit meter) upon each award generating event.

Note that when a player initially walks up to an electronic gaming machine, the player would need to fund the machine (add to the machine's credit meter) so that the player can play the game. The credit meter would at all times display the current amount of credits that the player (or technically a machine that the player is playing) has (possesses) at that time. A credit meter which displays 0 (zero) means that the player (machine) has 0 (zero) credits (has no funds) and typically would not be able to play. Typically, when a player first walks up to play a machine it would have zero credits on it because it is rare that another (prior) player would walk away from a machine that has credits on it (which are worth cash) without cashing out. For example, the player can insert paper currency in the form of a cash bill (e.g., a $20 or other denomination bill) into the bill validator associated with the slot machine, upon which the machine would credit the machine the $20 (typically by adding $20 to the machine's credit meter which is displayed on an output device on the gaming machine). If the credits are reflected in dollars, then $20 in the credit meter could display "$20." If the credits are reflected in cents, then $20 in the credit meter could be displayed "2000." There are other ways that a machine's credit meter can be initially funded or increased, such as an electronic payment method (which would electronically transfer funds to the player's credit meter from another source such as an electronic funds account). Another way to fund a machine (add to the machine's credit meter) is similar to inserting a bill into the bill validator but instead insert a cashless voucher (typically a barcode-printed slip of paper) into the bill validator which would then be received and scanned by the machine, and if validated, would credit the appropriate amount of the cashless voucher to the credit meter. For example if a cashless voucher (or ticket) is worth $34.21, then upon insertion of this cashless voucher the machine's credit meter would be increased by $34.21 (if the cashless voucher is valid). This is known in the art as a "ticket in ticket out" system. Upon an award generating event, an award sequence is initiated (see FIG. 2) and the credit meter will be deducted by the credit cost (because the player is paying credits to essentially make a wager which can result in an award of credits). If an award is earned as a result of the award sequence, this award (in credits) will be added to the credit meter. In this way, the player is wagering in the same manner that a player wagers in a prior art slot machine: the player initially funds the machine into credits (the current quantity of which is displayed on the credit meter), and upon each wager the player's credit meter is deducted by the cost of the play (in credits) and then is awarded (in credits) any award the player may earn (by adding that award (in credits) to the credit meter). When the player wishes to cashout (using various methods, such as receiving cash/coin, or receiving a new cashless voucher), the value of the cashout (e.g., the cash dispensed or the value of the cashless voucher) is equal to the amount of credits shown on the machine's credit meter upon cashout (the amount of credits the machine currently has). Thus, the player has the ability to deposit cash (which is converted to credits), and win/lose credits (which are directly redeemable for cash), and then redeem those credits (if any are left) for cash. In other words, the players credits (which are wagered upon award generating events and increased when the player receives an award) can be redeemed by the player (at the player's option) for value (cash).

Figure 2:
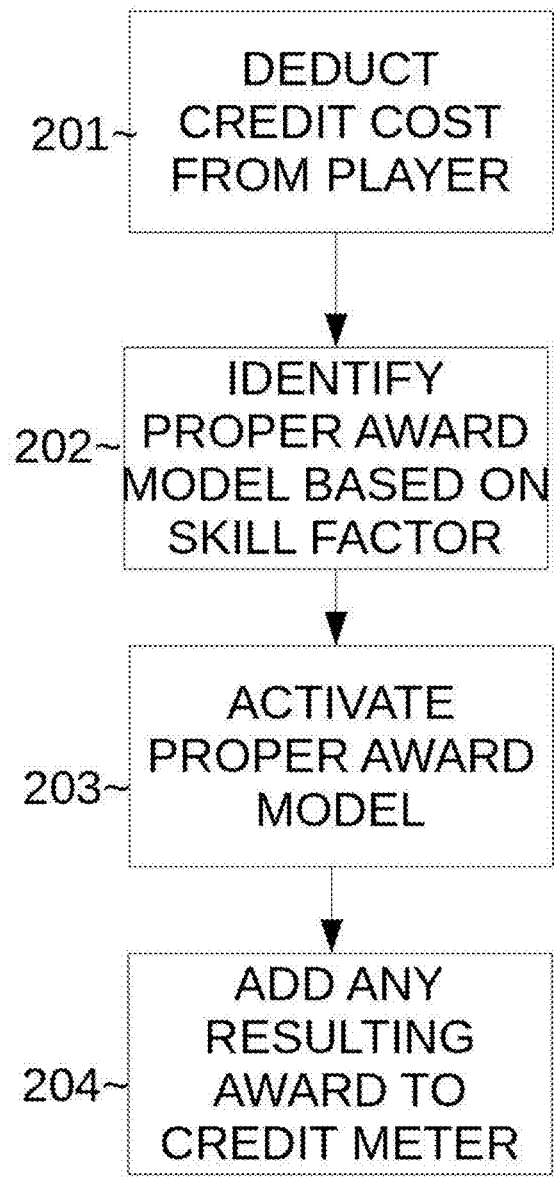
FIG. 2 is a flowchart illustrating an exemplary method of implementing an award generation sequence, according to an embodiment.

FIG. 2 is a flowchart illustrating an exemplary method of implementing an award generation sequence, according to an embodiment.

Figure 5:
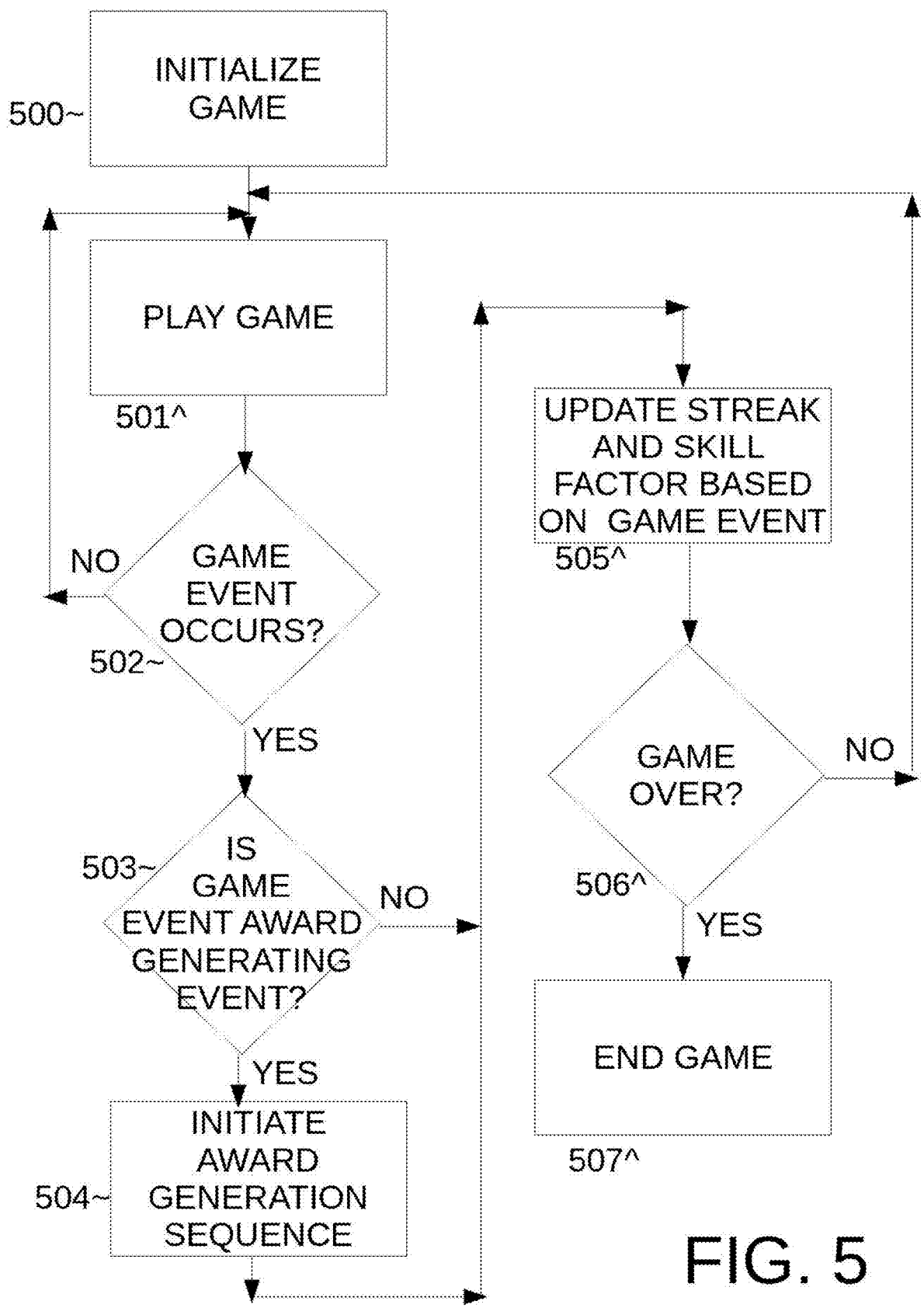
FIG. 5 is a flowchart illustrating an exemplary method of utilizing skill in a video game, according to an embodiment.

The award generation sequence is initiated after an award generating event occurs (see operations 503-504 in FIG. 5). The award generating event is an event occurring in the game (typically after a successful action by the player) which initiates an award generation sequence. The award generating event would be programmed into the software implement the game and would vary from game to game. For example, in a boulder-type game, award generating events could include successfully destroying a boulder, successfully destroying an alien ship, etc. In a brick breaker type game, award generating events could include successfully destroying a brick, etc. Generally speaking, award generating events include events upon which the player achieves something "good" in the game (that the player is trying to accomplish).

The award generation sequence can begin with operation 201, which deducts the credit cost from the player. The credit cost is an amount of credits that it cost the player to initiate an award generation sequence. In other words, when the player successfully causes an award generating event, the player still has to pay the credit cost in order for the opportunity to earn an award based on the proper award model. There typically is no cost to start playing the game, instead the player pays (wagers on) the machine (or game) upon each award generating event. The player can choose the credit cost at the beginning of the game (for example it could be $0.01, $0.05, $0.25, $0.50, $1.00, $2.00 or any other denomination/amount). The player's credit meter (a display that is typically displayed throughout the entire game and shows the current amount of credits the player has) is deducted by the credit cost (if the player has 100 credits and the credit cost is 5 then the player will have 95 credits). The credits can be directly redeemable for cash, for example each credit can represent $0.01 (or other amount).

From operation 201, the method proceeds to operation 202 which identifies the proper award model based on the skill factor (and also the difficulty level). For example, if the difficulty level is Easy then the set of models that would be used would consist only of Easy1, Easy2, and Easy3. The individual model that is then selected from this set would be based on the current skill factor (for example see Table IV). The determination of skill factor is described in more detail elsewhere in this document.

From operation 202, the method proceeds to operation 203 which activates the proper award model determined in operation 202. Each award model can be activated by calling a procedure along with the particular award model to activate and the procedure could compute and return a determination of the resulting award utilizing the particular award model. For example, activating an award model may involve invoking a pseudorandom number generator such as the Mersenne Twister to perform a lookup into a list of potential award values (such as depicted in Table III.)

From operation 203, the method proceeds to operation 204, which adds any resulting award (determined in operation 203) to the credit meter. If the resulting award is zero, then the credit meter would not be increased (either no operation to credit meter or an operation in the software would actually add the resulting award of zero to the credit meter, both having the same result).

Note that the methods described herein can be applied to any type of video game, including a shooter, brick breaker, balloon popper, etc. The first example type of game that will be described is a brick breaker game. A brick breaker game is a known game genre wherein a player controls a paddle and hits a ball with the paddle. The player can control movement of the paddle only left and right, or only up and down. In another embodiment, the player could move the paddle both left/right and up/down, such as around the perimeter of a 2D shape such as a rectangle. The ball generally obeys simple laws of motion/physics and will bounce accordingly. Each time the ball hits the paddle it will bounce off it. Displayed on each level of the game are a plurality of bricks (or other targets). Each time the ball contacts a brick that brick will be destroyed, although note that some bricks may require two or more hits before it is destroyed. Note that sometimes when a brick is destroyed it will release a falling "power up" which the player can catch with the paddle if the player wishes to activate the power up. Power-ups generally favor the player and can do different things. For example, power ups can: increase the size of the paddle (player favorable), decrease the size of the paddle (player unfavorable), spawn additional balls (player favorable), allow the paddle to catch balls (which can be released upon the press of a button), allow the paddle to shoot lasers (or other projectiles) such by the player pressing a button the paddle will launch a laser/projectile which will destroy a brick when the laser/projectile comes into contact with a brick. Power ups typically last a finite duration (e.g., 30 seconds or other temporal amount) upon which the power up wears off and the game returns to normal (default). Note that bricks would typically be stationary, although in an embodiment bricks (or other targets) can move as well.

Figure 3:
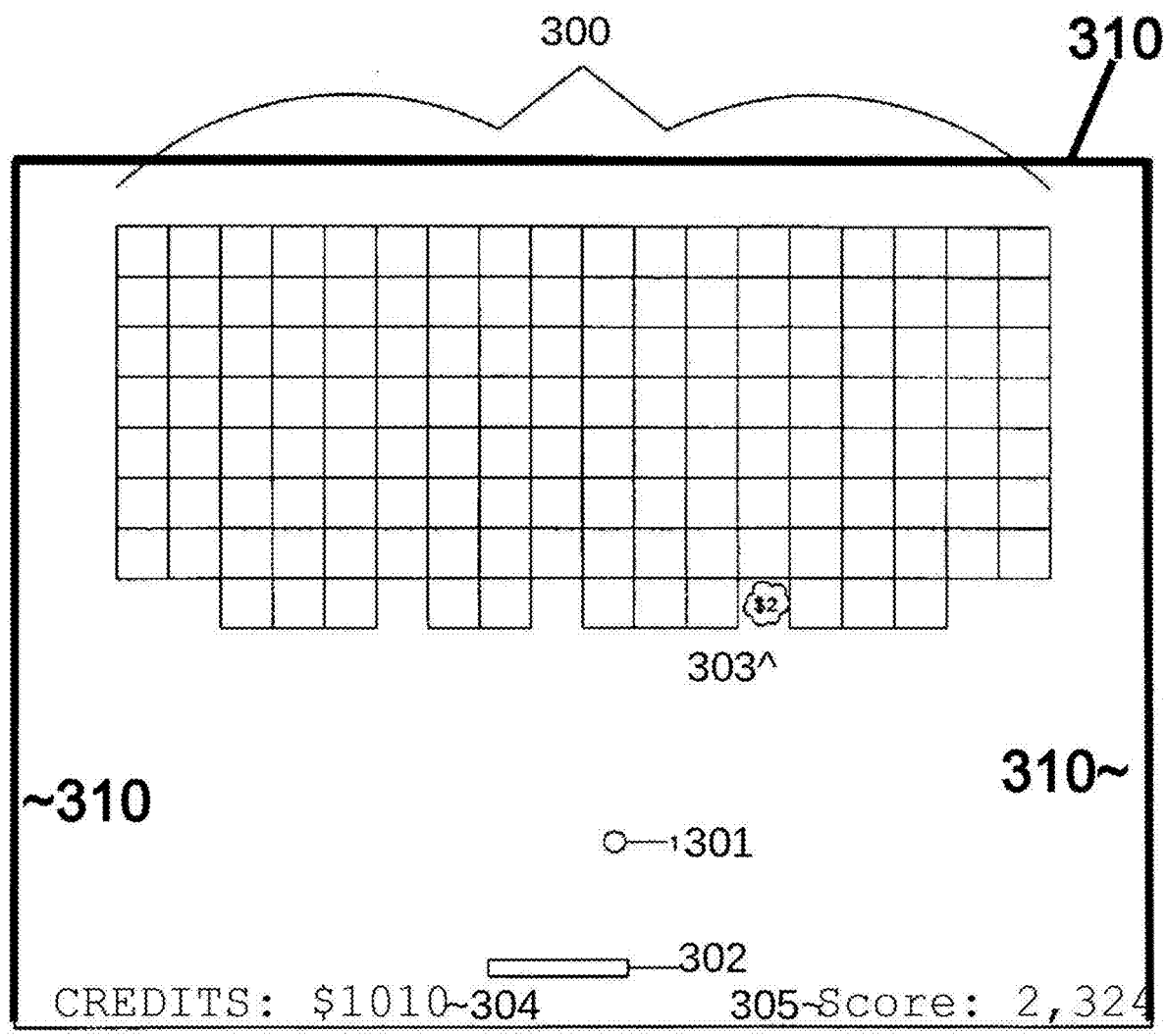
FIG. 3 is a drawing illustrating an example of a brick breaker video game, according to an embodiment.

FIG. 3 is a drawing illustrating an example of a brick breaker video game, according to an embodiment.

A paddle 302 is controlled by the player and the player can move the paddle 302 only left and right (e.g., by using any input device such as a joystick, dial, wheel, buttons, etc.). The ball 301 bounces area the game screen. Note that the game screen typically is surrounded by borders on each side so the ball 301 could not leave the game screen (upon hitting each border 310 (top, left, right) the ball 301 would bounce). In another embodiment, there would be a border on the left side, top, and right side of the game screen but the bottom would not have a border and thus if the ball fell to the bottom (without the paddle contacting the ball) then the ball would be lost (and to continue a new ball launch would have to be initiated). A plurality of bricks 300 are all available for the ball 301 hit. When each brick out of the plurality of bricks 300 is hit (contacted) by the ball 301, that brick would be destroyed which removes it from the screen (and this would be an award generating event). Note that the ball 301 destroyed a brick which activated an award sequence which resulted in an award of $2. A credit meter 304 shows currently how many credits the player has (in this example the player has 1010 credits and each credit is worth one dollar ($1) meaning the player has $1010 in credits). Some bricks may require multiple hits to destroy.

When the player destroys all of the bricks out of the plurality of bricks 300 (meaning no bricks are remaining on the game screen) then the game would advance to a new level (a new set of bricks would be displayed along with an optional new background).

Note that FIG. 3 also has a score meter 305 which displays the player's score. The player's score is a total number of points earned by the player. Points are non-functional quantities, in other words, the points have no effect on the player's credits (which are redeemable for cash). The score and points are only for recreational purposes. For example, known old (non-wagering) video game titles can be utilized for wagering purposes using the methods described herein however the scoring mechanisms used on the old video game could remain the same as in the wagering version. Thus, a player who used to play an old game could now play the wagering version and his/her score would be comparable to the score on the old non-wagering version because the actual gameplay of the game would remain the same. Points can be awarded for different in-game events. For example, each time a brick is destroyed the player can be award 5 points which are added to the player's score which is displayed on the player's credit meter 305. Upon completing a level, the player can be awarded an additional 100 points, which is added to the player's score. A leaderboard can be used to display the highest scores earned by players within a predetermined period of time (e.g., past 24 hours, past week, past month, all time, etc.) The leaderboard can be local (only high scores earned on a particular machine will be displayed) or casino-wide (all machines at a casino are networked and would share their scores with a server) so that the leaderboard would display the high score list tabulated across all machines in the casino (or "wide area leaderboard" can be used to display high scores among machines playing the game at different casinos among a casino group using a computer communications network connecting the machines of different casinos). Online embodiments can similarly display leaderboards with player scores aggregated across just one server (in networks with multiple servers) or across one or a collection of servers representing all of the players.

Note that the skill factor is used when determining which award model to utilize. The skill factor is a quantity which is a measure of the skill the player has recently exhibited while playing the game. Typically, the player would want to raise the skill factor because this would provide the player with a more favorable (higher expected value or return to player) award model.

Table V below illustrates one example of how a skill factor can be computed for a brick breaker type game. Note that "AGE" stands for award generating event and indicates whether the game event is an award generating event or not.

TABLE V

| Game Event | Skill Factor and Streak Computation | AGE? |
| --- | --- | --- |
| Ball hits (bounces off) paddle | streak = 0; skill factor = 0 | no |
| New ball launch | streak = 0; skill factor = 0 | no |
| Multi-ball activated | p = 3; skill factor = streak + p | no |
| Lasers activated | p = 3; skill factor = streak + p | no |
| Catch paddle activated | p = 3; skill factor = streak + p | no |
| Expand paddle activated | p = 3;skill factor = streak + p | no |
| All power-ups deactivated | p = 0; | no |
| Laser shot hits brick | skill factor = 3; streak is ignored | yes |
| Laser shot hits enemy | skill factor = 3; streak is ignored | yes |
| Paddle hits enemy | skill factor = 3; streak is ignored | yes |
| Ball hits brick | streak + = 1; skill factor = streak + p | yes |
| Ball hits enemy | streak + = 3; skill factor = streak + p | yes |

Thus, in Table V, certain game events (but not all) affect the streak. For example, on a new ball launch (which includes when a new level or game begins), both the streak and the skill factor are set to zero. As the ball hits each brick, the streak is increased by one. Note that if the ball hits the paddle then both the streak and the skill factor are set to zero. Thus, as the ball bounces around and hits bricks (without hitting the paddle) the streak would be increased by one for each brick hit (typically a brick hit once by the ball is destroyed and disappears). Note that there is a wall (border) on all four sides of the game screen, and thus the ball can hit the wall without affecting the streak or skill factor because hitting the wall is not a game event. In some instances, the player can hit numerous bricks while the ball bounces of the top (e.g., the top wall or any other wall) which would increase the streak and hence skill factor which would be to the player's advantage since a higher skill factor would result in a more player favorable award model. A game screen can have enemies (which can optionally move) which are not bricks and can increase the streak by 3. The player would try to avoid the ball hitting the paddle because that would reset the streak (and skill factor) to zero.

Note that the game events in Table V can all be considered a set of game events, and all of the game events in which the streak increases (i.e., ball hits brick, ball hits enemy) can be considered a streak increasing subset of the set of game events. Game events in which the streak is reset can be considered a streak resetting subset of the set of game events (i.e., ball hits paddle, new ball launch). Game events in which in which the skill factor is computed based on the streak can be considered a skill factor based on streak subset of the game events (i.e., any of the power-ups activated, ball hits brick, ball hits enemy).

There are four power ups in Table V, and each time one of these power ups is activated (i.e., a brick is destroyed which releases a power-up icon which falls downward on the screen and the paddle contacts the falling power up) then the flag (variable) 'p' is set to 3, and when the skill factor is computed upon an award generating event such as the ball hitting a brick, the skill factor is equal to the streak plus p (which is equal to 3 and can be any non-zero positive constant). When the power-up expires (after a predetermined amount of time such as 30 seconds) then p is reset back to 0. Thus, whenever the player activates one of the multi-ball power-ups, the laser power up, the catch paddle power up, and the expand paddle power up, or at least one of these power-ups remains active, then the skill factor would be increased by 3 for some award generating events (such as ball hits brick, ball hits enemy). Some award generating events do not factor in p and thus having an active power-up does not affect the skill level, such as laser hits brick, laser hits enemy, paddle hits enemy. Any award generating game event and its respective skill factor and streak computation can be programmed to incorporate p or not. Thus, the players would be motivated to catch the power ups since it would mean the skill factor would be equal to the streak plus 3 for certain award generating game events. If the laser power-up is active, and the player shoots the laser (by pressing a button) and hits a brick or an enemy, the skill factor is equal to 3 while the streak is ignored and remains unchanged. If the paddle destroys an enemy (i.e., an enemy is on the path of the paddle and the player collides the paddle into the enemy) then the skill factor is equal to 3 while the streak is ignored and remains the same. Note that the values in Table V (and all other values described herein) represent one example of how skill factors and difficulty levels can be adjusted, and it can be appreciated that other values, methods, conditions, etc., can be utilized as well.

Note that if there is more than one ball (for example if the multi-ball power up is activated), then each ball would have its own streak quantity. For example, the newly spawned balls would start with a streak of zero but then their streak would be computed in the same manner as described herein. Thus, each ball out of a plurality of balls could have its own skill factor and hence its own award model (different from the other balls) depending on the activities of each ball. Alternately, a global streak quantity may be kept across all balls, with each game event involving any ball affecting that global streak quantity as appropriate.

With regard to power-ups, note that in some cases one power-up may deactivate another power-up. For example, if the player already has the laser shot power-up (which allows the player to shoot lasers out of the paddle, the lasers destroying bricks upon contact) then if the player gets the expand power-up this will remove (deactivate) the laser power-up, and vice versa. However, in some cases getting a power-up would not deactivate another power-up. For example, if the player got the multi-ball powerup (which generates two additional balls for a total of three live balls), and then the player gets the laser power-up, the laser power-up would not deactivate the multi-balls and there can be three balls activate on the game screen while the player has the laser (also referred to as laser shot) power-up. With regard to having multiple power-ups active at any given time, this can be handled in one of numerous ways: 1) the game would not allow more than one powerup to exist at one time, and thus the skill factor would only reflect one power-up being active; 2) the game would allow more than one power-up to be active at one time but the skill factor would only reflect one power-up being active; 3) multiple power-ups can be active at one time, and the player's skill factor can reflect more than one power up being active at one time. As an example of the third paradigm, p can be set to 3 if one power-up is active, and p can be set to 4 if two power-ups are active, and p can be set to 5 if three or more power-ups are active. In this way, the player's skill factor can be increased commensurate with the number of power-ups the player currently has active. Typically, each power-up would expire (become inactive) after a predetermined amount of time, although some power-ups expire based on game events but do not expire based on time (for example the multi-ball power-up would expire when then player loses the two extra balls and only has one live ball remaining).

When a game event occurs, the skill factor and the streak may have to be adjusted (the streak can be utilized when computing the skill factor).

Figure 4:
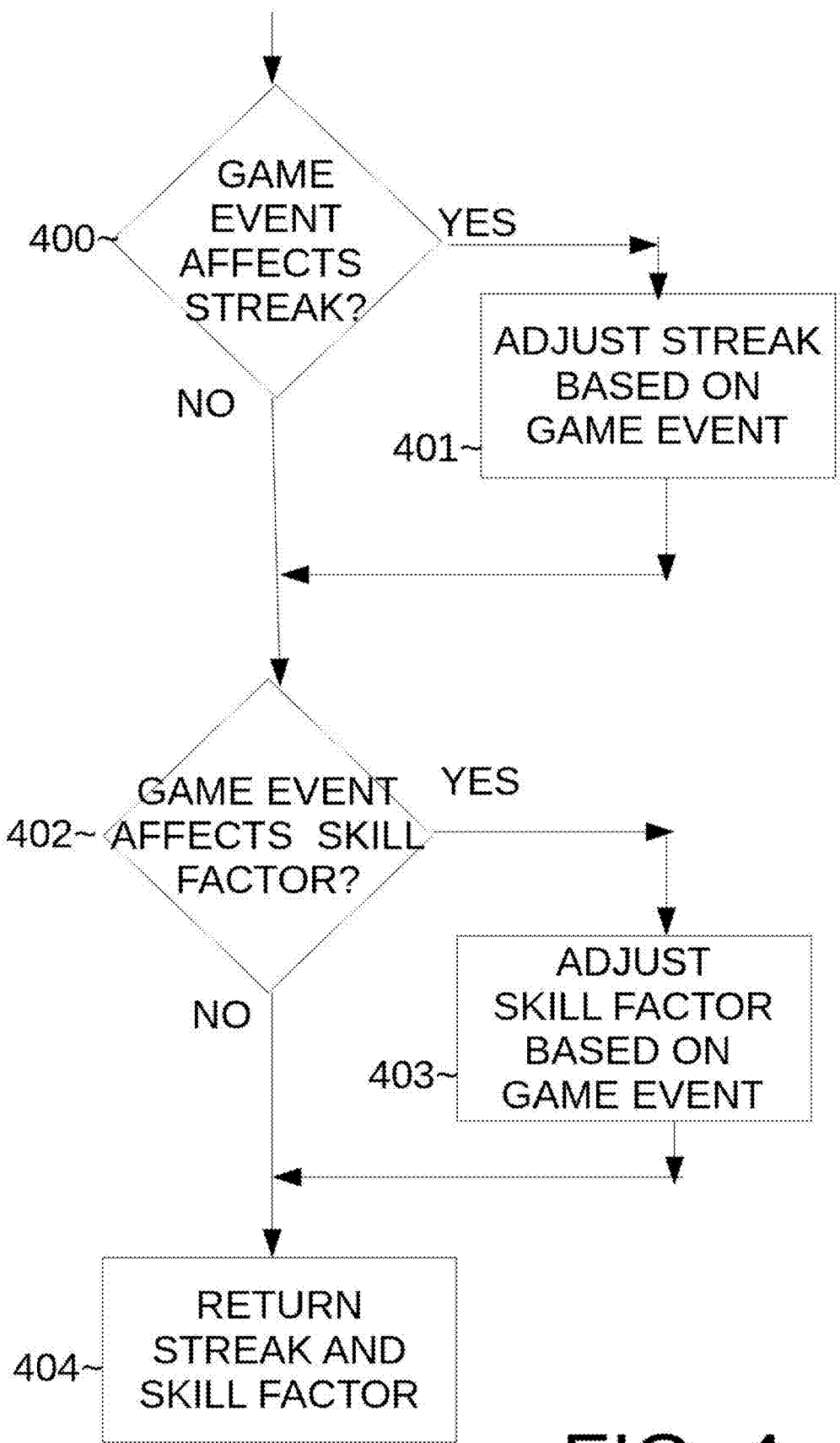
FIG. 4 is a flowchart illustrating an exemplary method of computing a skill factor, according to an embodiment.

FIG. 4 is a flowchart illustrating an exemplary method of computing a skill factor, according to an embodiment. The method in FIG. 4 is initiated when a game event happens. A set of game events is predefined which comprises particular events that can happen in the game. A game occurs when any one of these game events in the set of game events has occurred. If an event occurs that is not in the set of game events, this is not considered a game event.

In operation 400, it is determined whether the game event that has occurred affects the streak. Each game event is associated with a formula/route which can affect the streak and/or skill factor. If the game event does not affect the streak, then the method proceeds to operation 402.

If in operation 400, the game event that occurred affects the streak (e.g., the game event is associated with an update (or potential update) of the streak, then the method proceeds to operation 401 which adjusts (computes) the streak based on the game event. Each game event will have associated with it a formula/routine on how the streak is computed based on the game event. From operation 401 the method proceeds to operation 402.

In operation 402, it is determined if the game event affects the skill factor. Each game event is associated with a formula/routine which can affect the skill factor. If the game event does not affect the skill factor, then the method proceeds to operation 404.

If in operation 402, the game event does affect (or can potentially affect) the skill factor, then the method proceeds to operation 403 which adjusts (computes) the skill factor based on the game event. In some cases the skill factor can be based upon the streak. Each game event will have associated with it a formula/routine on how the skill factor is computed based on the game event. From operation 403, the method proceeds to operation 404.

In operation 404, the updated streak and updated skill factor are returned. Note that it is possible that the streak and/or skill factor may remain the same as they were before operation 400 was initiated. However, the skill factor and/or streak would probably be changed upon a game event occurring. In an alternate embodiment, the skill factor is adjusted before the streak is adjusted, e.g. steps 400 and 401 are after steps 402 and 403.

FIG. 5 is a flowchart illustrating an exemplary method of utilizing skill in a video game, according to an embodiment.

The method can begin with operation 500, which initializes the game. This can include things like the player choosing the difficulty level and denomination, as illustrated and described with regard to FIG. 1. The player can also have the ability to deposit money, such as cash or a cashless ticket in which the machine being played would credit the player with an appropriate amount of credits. For example, if the player inserts a $10 bill into a bill validator attached to the machine, the machine would credit the player's credit meter with $10 in credits (e.g., 1,000 credits if each credit is worth $0.01). A bill validator can also accept cashless tickets (vouchers) generated from a ticket-in-ticket-out system which would credit the player the amount designated on the ticket. The initialization can also provide the player with an option to view all help screens, or configure game settings, etc., and enable the player to initiate a game for real money.

From operation 500, the method proceeds to operation 501, which enables the player to play the game. The game would be coded in software (executed by the machine itself, one or more remote computers, or a combination of the two) and would display the game on an electronic output device (e.g., touch-screen, LCD, etc.) There would be one or more input devices used by the player to communicate with the machine, for example a joystick, trackball, wheel, touch-screen, physical buttons on the console, etc. The player could control the game with the joystick as well as using the touch-screen and/or buttons on the console to augment the controls available from the joystick. The game would be displayed on the output device and audio associated with the game (e.g., explosions, etc.) would be played through speaker(s) attached to the machine. Any kind of video game (whether known at the time of filing or not) could be implemented using the methods described herein.

From operation 501, the method proceeds to operation to operation 502 which determines whether a game event occurs. A game event is an event that can occur during play of the game that is in a set of possible game events. A game event is typically an event that is an award generator event and/or an event that changes the streak and/or skill factor. If no game event has occurred, then the method returns to operation 501 which continues play of the game.

Note that operations 501-502 are continuously running. In other words, operation 501 could execute for a small amount of time (e.g., a certain number of clock cycles, seconds, or until a point in the code occurs) upon which operation 502 is initiated. Alternately, operation 502 could be an event listener, an interrupt, or receipt of a message, as is known in the software art. The main point to keep in mind is that operations 501-502 allow for continued play of the game until a game event occurs.

If a game event occurs, then the method proceeds to operation 503, which determines whether the game event that occurred (determined to have occurred in operation 502) is an award generating event. Not all game events are award generating events. Award generating events are programmed into the software and are discrete events that the player typically tries to have happen so that the player would have the opportunity to earn an award. If the game event that occurred is not an award generating event, then the method proceeds to operation 505.

If in operation 503, it is determined that the event that occurred (operation 502) is an award generating event, then the method proceeds to operation 504, which initiates an award generation sequence. This can be accomplished as illustrated and described with respective to FIG. 2. From operation 504, the method proceeds to operation 505.

In operation 505, the current streak and skill factor are updated based on the game event (using predefined rules). It is possible that the streak and/or skill factor may remain the same after the update, although more commonly the skill factor and/or streak are changed (updated) from their previous values.

From operation 505, the method proceeds to operation 506, which determines whether the game is over. The game would be determined to be over if at least one game over condition is satisfied. For example, in a brick breaker game, the player may be provided at the start of the game with a finite amount of balls (e.g., 3) and after all three balls are lost (e.g., fall to the bottom of the screen) then the game would be over. In a shooting type game, the game can be over when all of the player's spaceships are destroyed. Note that if the player runs out of credits (or his/her credits are lower than the credit costs deducted in operation 201), then the game would also be over (since the award generation sequence could not be initiated since the player would not have enough credits). If the game is not over, then the method returns to operation 501, wherein the gameplay continues.

If in operation 506, it is determined that the game is over, then the method proceeds to operation 507 which can end the game. Before the game is ended, however, the player can be presented with an opportunity to deposit more money in order to continue the game (for example, the player can insert more money which can result in additional credits and a number of additional balls, which may or may not be the same number as upon initial commencement of the game). In another embodiment, the player can be given a choice whether he/she wants to end the game or continue playing from the previous point, and the player can continue playing without paying any additional money to continue playing (except if the player is also out of credits, in which case additional money would be required). In this embodiment, the method would just return to operation 501 and provide player more balls, ships, or other "lives" that the player may need. If the player does not take a required action to continue the game, then the game would be over which means it could not be continued. The method could then return to operation 500 in which the player (or a new player) could choose a new denomination and difficulty level.

Note that there are two ways in which a game can end: out of credits, and game over. If the player runs out of credits while the player is playing the game (e.g., the player was not lucky and lost more on award generating events than the player has won), then it is possible (and even likely over the long run) that the player's credit meter will reach zero. If the credit meter is at zero (0), then the player would not be able any longer to have a credit cost deducted from the player's credit meter (see operation 201). Thus, once the player runs out of credits, a message can be displayed to the player to the effect of "out of credits" and game play can stop. The player can then either 1) walk away, or 2) insert more credits (e.g., insert a cash bill (such as a $20, $100, etc.) into the bill validator associated with the machine, which will credit the player's credit meter with the appropriate amount of credits, and the player can then continue the game where the game left off just before the out of credits state was generated. After a predetermined amount of time (e.g., one minute), the game may no longer allow the player to continue the game by inserting more credits and only a new game can be initiated. Note that when the out of credits state occurs, the player will have zero credits in the credit mater.

The game can also end with a "game over" state. A game over state is similar, but different to the out of credits state. The game over state is reached when the player loses all of his/her lives (or other finite quantity required to play). For example, in the space shooter game, the player can initially be given three ships to play with (which can be destroyed by enemy ships or collisions). If the player loses all of his lives (three ships) then the game would stop and display a message to the effect of "game over." At this point, the player can choose (by indicating to the machine using an input device) one of the following options 1) cashout any remaining credits the player has and walk away; 2) begin a brand new game, 3) continue where the player left off. Typically, the player can continue where the player left off and be given three (or other amount) of additional lives for free, although in another embodiment the player would have to pay a predetermined amount of credits in order to continue playing. In contrast to the out of credits state, when the game over state is reached the player will have some credits remaining on the credit meter (it is possible but extremely unlikely that the player will have exactly zero credits on the credit meter and be in the "game over" state). The player, in all game states (including when playing), always has the ability at any time to cash out the entirety of the player's credit meter (e.g., receive a cashless voucher for the entire amount of credits).

Table VI below illustrates one example of play of the brick breaker game. Listed is a sequence of game events and how the award model, streak, and skill factor are affected by the game event. Note that the streak and skill factor in Table VI are computed after the game event has taken place and after an award generation sequence (if any) is activated. Note that the "award?" column represents whether an award generation sequence is triggered for that game event. If an award generation sequence is triggered for that event, it would use the award model shown in that row (which is before any updates to the streak and/or skill factor take place based on the current game event). Note that the parameters in Table V are applied to generate the values in Table VI. The notation "n/a" means "not applicable" because if no award is generated then there is no award model being used.

TABLE VI

| Game Event | Award Model | Award? | Streak | Skill factor |
|---|---|---|---|---|
| Player launches ball | n/a | no | 0 | 0 |
| Brick is destroyed | 1 | yes | 1 | 1 |
| Ball bounces off paddle | n/a | no | 0 | 0 |
| Brick is destroyed | 1 | yes | 1 | 1 |
| Brick is destroyed | 1 | yes | 2 | 2 |
| Expand is activated | n/a | no | 2 | 5 |
| Brick is destroyed | 2 | yes | 3 | 6 |
| Brick is destroyed | 3 | yes | 4 | 7 |
| Brick is destroyed | 3 | yes | 5 | 8 |
| Ball bounces off paddle | n/a | no | 0 | 3 |
| Brick is destroyed | 2 | yes | 1 | 4 |
| Ball is lost, new launch | n/a | no | 0 | 0 |

Note that whenever a power-up is active, such as the expand power-up, then (according to Table V) then p=3 which in some award generating events, affect the skill factor computation (for example, when ball hits brick, skill factor=streak+p (which would be 3 due to the power-up)). A power-up may last for 30 seconds (or other amount), and this explains why the skill factor is 3 plus the streak for all of the successive game events in the example in Table VI (until the ball is lost). Power-ups are automatically deactivated (made inactive) after the predetermined amount of time expires (e.g., 30 seconds). Each power-up that is activated would replace the prior activated power-up, if any. Alternately, each power-up that is activated would have its own separate timer, so that if a first power-up is activated and then a second power-up is activated 20 seconds later, the first power-up would expire in 10 more seconds, but the second power-up would expire 20 seconds after the first power-up expired. As long as any power-up remains active, then p would equal 3 (regardless of how many power-ups are active), but when there are no power-ups active then p is equal to 0. Note that the award model corresponds to the selected difficulty level, for example if the difficulty level of Easy was selected, then award model 1 refers to Easy1, award model 2 refers to Easy2, award model 3 refers to Easy3, etc. The award model is generated from the previous row's skill factor (using Table IV). Note that the example in Table VI utilizes the method illustrated in FIG. 5, not FIG. 6.

In Table VI, the game starts with the streak and skill factor initialized to be zero). The second game event ("Brick is destroyed") is an award generating event with the award model of Easy1 (from Table IV with the skill factor being zero) being used (assuming the difficulty level selected for this game was Easy). Looking at the rules in Table V, when a brick is destroyed (in this example hitting a brick with the ball will destroy it and hence they are the same thing) the streak is increased by one and the skill factor equals the streak. Thus, the streak and skill factor are now 1. In the third game event (ball bounces off paddle which means the ball hits the (typically top) of the paddle and bounces off it) from Table V this sets the streak and skill factor both to zero. In the fourth game event (brick hit/destroyed), this is an award generating event with an award model of Easy1 (from Table IV). The streak and the skill factor (from Table V) become 1. In the fifth game event (brick hit/destroyed), this is another award generating event with an award model of Easy1 (from Table IV). From Table V the streak is increased by one and the skill factor is equal to streak, which means the streak and skill factor are both now 2. In the sixth game event (the expand power-up is activated), the skill factor is set to 3 plus the streak (however, note that the skill factor being the streak augmented by 3 for some award generating events only happens while the power-up is still active, and when the power-up is no longer active then for these award generating events the skill factor is not augmented by 3 any longer (since p would be zero). It is assumed for this example that the expand power-up is active for the remaining game events in Table VI until the last game event (ball is lost). In the seventh game event a brick is destroyed which is an award generating event, and since the skill factor is 5 from Table IV we now use an award model of Easy2 for the award generating event (the award generation sequence). From Table V, when a ball hits a brick the streak is increased by 1 (which means the streak is now 3) and the skill factor is equal to the streak which is 3 but since the expand power-up is still active the skill factor is equal to the streak plus 3 which is 6. In the eighth game event (brick is destroyed) the skill factor is 6 therefore award model 3 (in this example, Easy3) is used, then the streak is updated to 4 and the new skill factor is 7. In the ninth game event (brick is destroyed) the skill factor is 7 therefore award model 3 is used, then the streak is updated to 5 and the new skill factor is 8. In the tenth game event (ball bounces off/hits paddle), from Table V this means that the streak and the skill factor are both now set to zero, and since the expand paddle power-up is still active the skill factor is equal to the streak plus 3 which equals 3. In the eleventh game event (brick is destroyed), since the skill factor is 3 the award model used for the award generation sequence is Easy2 (from Table IV). From Table V, for a brick-hit game event, the streak (of 0) is increased by 1 and the skill factor is equal to the streak and since the expand-paddle power-up is still active the skill factor is equal to the streak plus 3 which is 4. In the twelfth game event (ball is lost, new launch, which can happen when the ball falls below the paddle (in other words the player failed to hit the falling ball with the paddle), from Table V (this can be considered the same as "new ball launch") the streak and skill factor are both set to zero.

Figure 6:
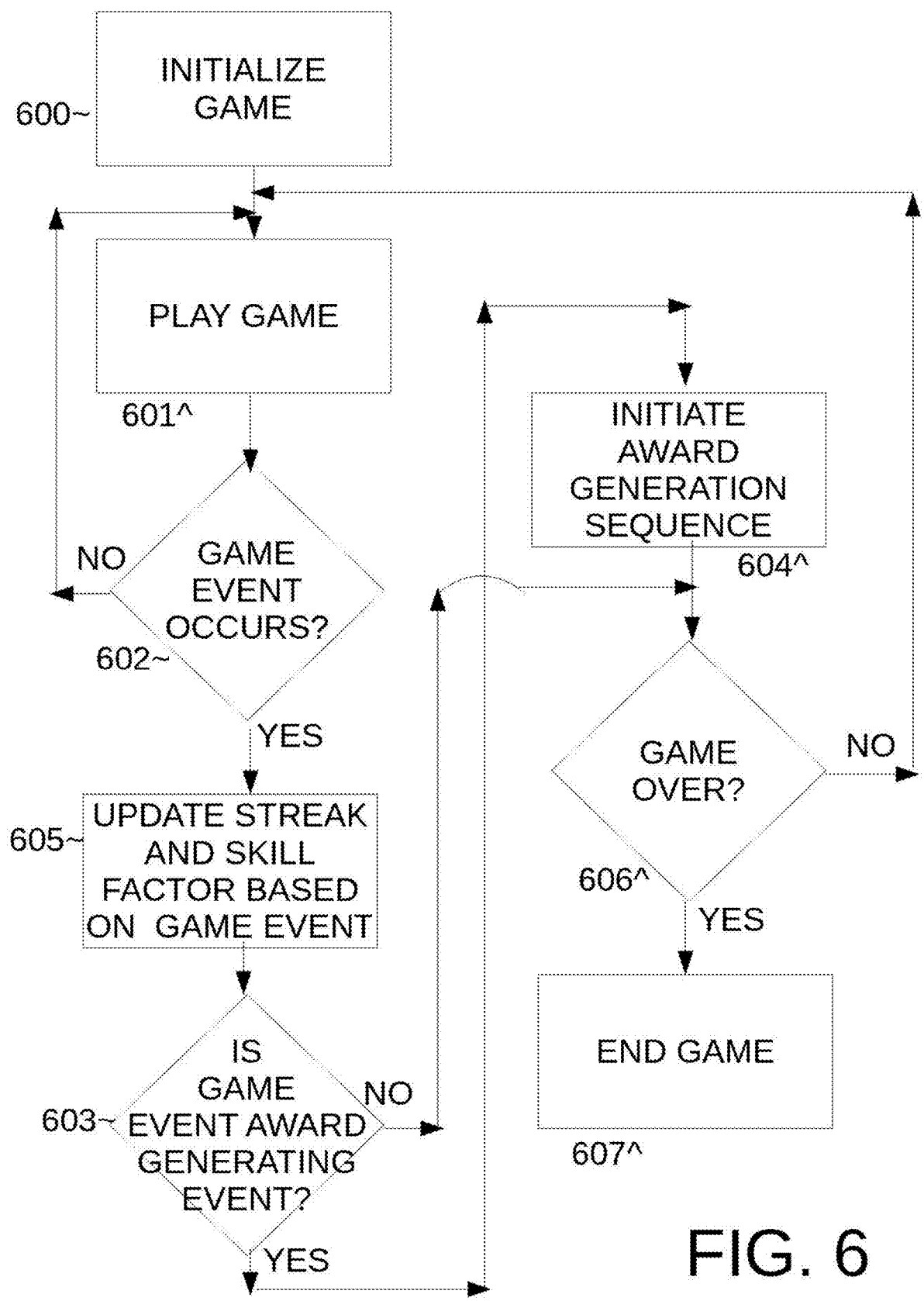
FIG. 6 is a flowchart illustrating an alternative method of utilizing skill in a video game, according to an embodiment.

FIG. 6 is a flowchart illustrating an alternative method of utilizing skill in a video game, according to an embodiment.

In FIG. 5, it is noted that the award generation sequence would be initiated before the streak and skill factor are updated. Thus, the updated streak and skill factor (which happens after the award generation sequence) does not affect the award generation sequence that was most recently executed. In another embodiment (illustrated in FIG. 6), the streak and skill factor are updated after a game event occurs before the award generation sequence is initiated. In this way, the award generation sequence reflects the updated streak and skill factor for the most recent game event.

The operations in FIG. 6 are performed identically to their counterparts in FIG. 5 (counterparts are the same reference number but starting with a '5' instead of a '6'). However, the order of operations is different. Note that in FIG. 6, operation 605 (updating streak and skill factor based on game event) occurs before the check for whether the game event is an award generating event and the award sequence initiation (if there is one). If the event (game event from operation 602) is not an award generating event, then the method would proceed to operation 606. FIG. 6 operates similarly to FIG. 5 but in FIG. 6 the first game event may affect the award generation sequence and the award model used, while in FIG. 5 award generation sequence and the award model used for the first game event would not be affected by the game event.

Figure 7:
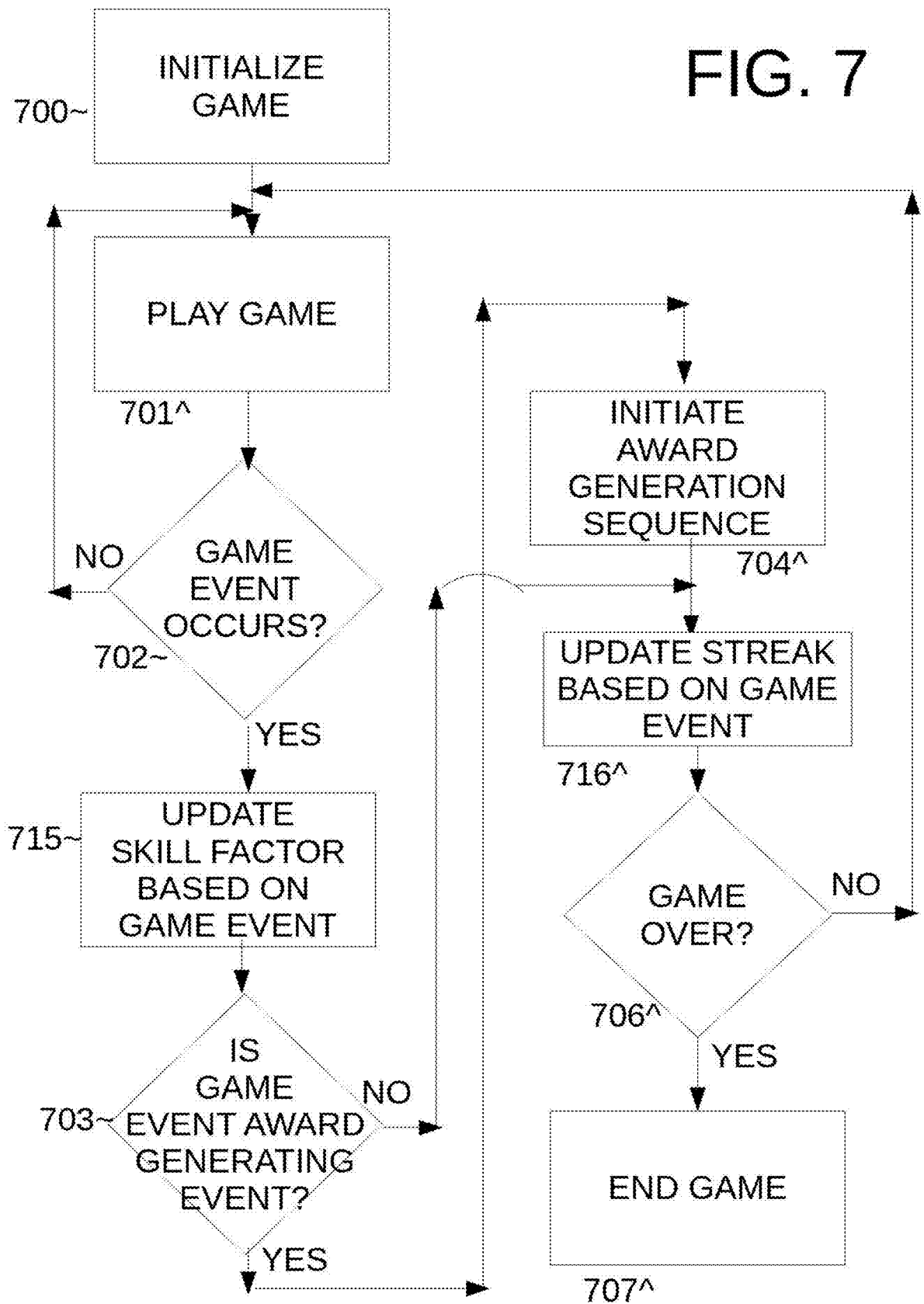
FIG. 7 is a flowchart illustrating a hybrid method of utilizing skill in a video game, according to an embodiment.

FIG. 7 is a flowchart illustrating a hybrid method of utilizing skill in a video game, according to an embodiment.

In the method illustrated in FIG. 7, in operation 715 the skill factor is updated based on the game event (utilizing predetermined rules on how to update the skill factor based upon the game event which could also incorporate the streak) before the award generation sequence (in operation 704) and then the streak can be updated (in operation 716) based upon the game event (utilizing predetermined rules on how to update the streak based upon the game event which could also incorporate the skill factor). In other words, this is a hybrid approach in that one component of the skill factor computation is updated before the award model is determined and another component of the skill factor computation is updated after the award model is determined.

FIG. 7 operates in the same manner as in FIGS. 5 and 6 (the counterparts of the operations in FIG. 7 operate the same way as described with regard to FIG. 5), and operations 715 and 716 are similar to operation 505 but are broken up into separate operations performed at separate times. In another hybrid embodiment, the streak may be updated prior to the initiation of the award generation sequence and the skill factor may be updated after.

Furthermore, it is noted that the quantities "skill factor" and "streak" are descriptive terms and these can refer to other quantities as well. For example, "streak" can be replaced with "accuracy", "effectiveness", "speed", etc.

Note that another type of game genre that can be applied to the methods described herein is a shooter game (although note that most, if not all, genres of arcade games can be applied to the methods described herein). A shooter game typically allows the player to control a launcher (typically the player can only move and/or aim the launcher in one direction (left/right or up/down) but in another embodiment the player would be able move and/or aim the launcher in all directions). The player can launch projectiles which shoot out of the launcher in a direction the launcher is pointing. Note in all games utilizing the methods described herein, any input device can be used by the player to control actions of the game and make choices (e.g., move player movable pieces, shoot, etc.) Such input device can be a wheel, joystick, buttons, touch-screen, trackball, dial, etc. There are a plurality of targets and when the projectile that the player launched hits (contacts) a target, the target would be destroyed (be removed). In an embodiment, one hit by a projectile would be enough to destroy a target. In another embodiment, it may take more than one hit by a projectile in order to destroy a target. A game generating event can either be when a projectile contacts a target (whether or not it destroys it) or only when a projectile actually destroys a target. When all of the targets are destroyed on a level, then the game can proceed to a new level which would generate a new set of targets (possibly with a new background). The targets would typically move around (although some or all can remain stationary as well). The targets can also fire weapons towards the launcher, and when the launcher is hit by a weapon the launcher can be destroyed. The player can typically be given a predetermined number of launchers (for example 3) and when all three of the player's launchers are destroyed then the game is over (although the player can be offered an opportunity to continue playing). In another embodiment, a player can be given an unlimited number of launchers.

Figure 8:
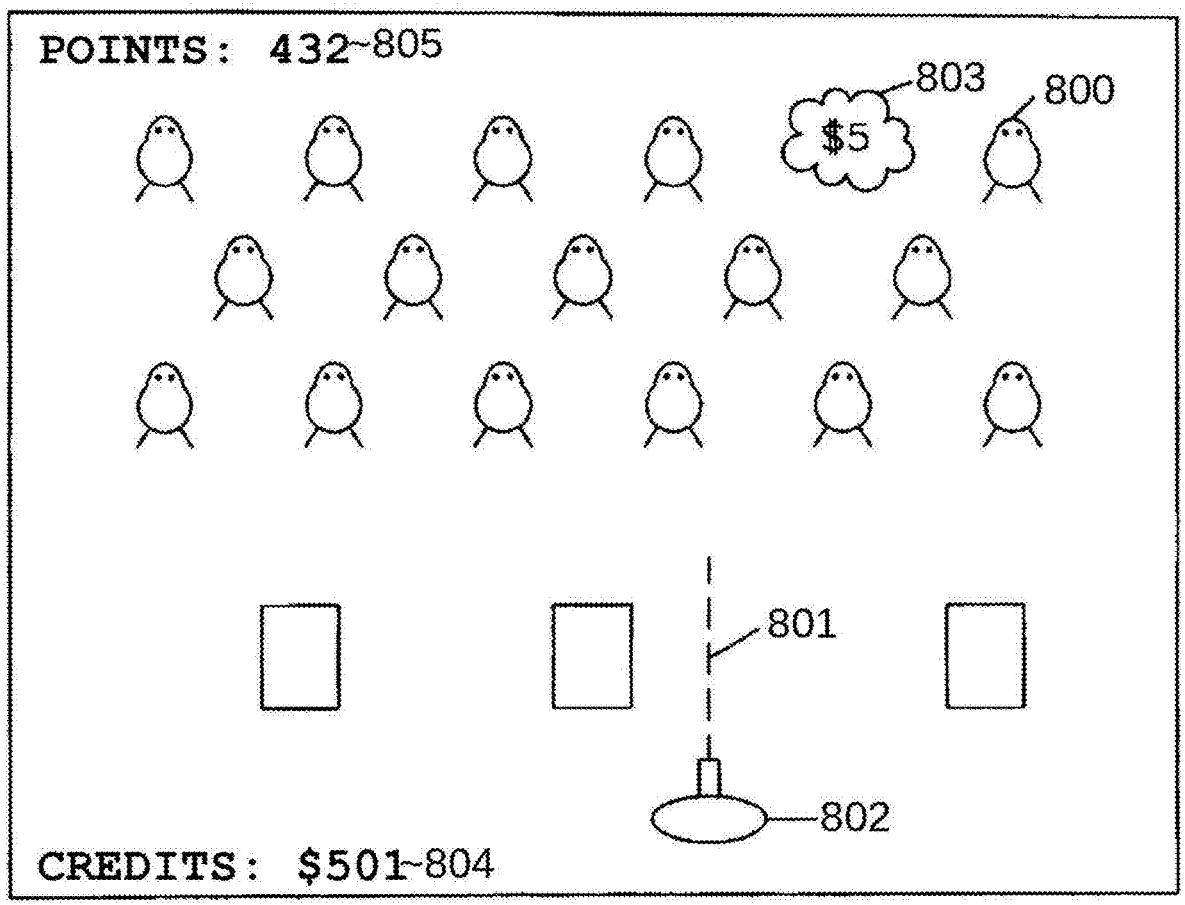
FIG. 8 is a drawing illustrating an example of a shooter game, according to an embodiment.

FIG. 8 is a drawing illustrating an example of a shooter game, according to an embodiment.

A set of targets 800 are populated in the game screen, which can be aliens or any other type of indicia. A launcher 802 is controlled by the player and in this game can only be moved by the player left and right. The player can choose to launch projectiles 801 which are launched straight up from the launcher 802. In another embodiment, the player can use an input device to change the direction of launch of the projectiles 801. When a projectile 801 contacts a target 700 the target would be destroyed and disappear which would be an award generating event which can generated an award 803. In this example, the player launched a projectile which struck a target which disappeared and triggered an award generation sequence which results in an award 803 of 5 credits. In this example, each credit can be redeemed for $1. When all of the targets 800 are destroyed, then the player can advance to a new level which could generate a new set of targets with a new background. A credit meter 804 indicates how many credits the player currently has.

A score meter 805 can also be displayed which displays a player's score. The score cannot be redeemed for credits or cash and is purely for entertainment (non-wagering) purposes. Each time a player shoots a target (or other point-generating event) the player can be awarded a predetermined amount of points (e.g., 1 point for each stationary alien destroyed, 5 points for each moving alien destroyed, etc.) and the score meter can be increased accordingly for each point generating event that occurs. The number of such points can be considered the player's score and the score meter 805 displays the player's score. The score can be used for social/entertainment purposes, for example a player can remember his/her score and can brag to his/her friends that he obtained a particular score (higher the better). In a network-connected embodiment, the player's score can be posted to social media accounts or otherwise publicized for bragging rights. The score would be reset to zero for each new game and can add to the enjoyment factor for the player as standard video games would typically have such a score which would reflect the player's skill and progress in the game. However, the score has no functionality with regard to wagering and has no effect on credits, awards, or any other wagering aspect of the game.

In a further embodiment, there can be different types of targets (e.g., different appearances, etc.) and each different type of target could have its own set of models. For example, in a shooter game, there can be aliens and saucers. All aliens (assuming the player selected the Easy difficulty level at the start of the game) could have award models selected from (alien-Easy1, alien-Easy2, alien-Easy3) and all saucers could have award models selected from (saucer-Easy1, saucer-Easy2, saucer-Easy3). Which of the three models for each type of target would be determined as described herein. Thus, based on the player's skill factor if the award model the player is entitled to is Easy2, then if the next target destroyed was an alien then the award generating sequence would utilize alien-Easy2 as the award model, while if the next target destroyed was a saucer, then the award generating sequence would utilize saucer-Easy2 as the award model. The alien award models (alien-Easy1, alien-Easy2, alien-Easy3) would all differ from the saucer award models (saucer-Easy1, saucer-Easy2, saucer-Easy3) in at least one attribute such as available awards, RTP (return to player), variance, hit frequency, etc. In an embodiment, the alien award models could have the same return to player (expected value) as their corresponding saucer award models while all having a different variance. In another embodiment, the alien award models could all have a different RTP than their corresponding saucer award models.

Table VII below illustrates one example of how a skill factor can be computed for a shooter type game. Note that "AGE" stands for award generating event and indicates whether the game event is an award generating event or not.

TABLE VII

| Game Event | Skill Factor and Streak Computation | AGE? |
|---|---|---|
| Missed shot | streak = 0; skill factor = 0 | no |
| Hit on flying target | skill factor = streak + 3 + p; streak += 1 (after hit) | yes |
| Hit all other target | skill factor = streak + p; streak += 1 (after hit); | yes |
| Power-up activated | p = 3 | no |
| All power-ups deactivated | p = 0 | no |

When a consecutive target is hit, streak is increased by 1 regardless of what type of target was hit. Note that when a target is hit the streak would be increased by one after the hit (that is, the award model used for the immediate hit would not reflect the streak incremented by 1, that would be reflected on the next consecutive hit). Note that in this example one hit would destroy a target so that hit would mean destroy, although in another embodiment it may take more than one hit to destroy a target and either any hit (including destroy) could be an award generating event or only the destroy would be an award generating event. In the example of FIG. 8, a flying target means that the target is either entering the screen (from offscreen) or divebombing (flying downwards towards the launcher). An alien (target) in formation means the alien can be stationary or moving in formation but not otherwise flying or divebombing. All other targets (aside from flying targets) can be aliens in formation, or other aliens or targets and can be considered "non-flying targets").

Note that if a player launches a projectile and hits a target then this would be an award generating event, which initiates an award generation sequence (see FIG. 2). If the player launches a projectile and misses (does not hit a target) then this would not trigger an award generating event, and this can be handled in two ways: since it is not an award generating event no credit cost is deducted from the player for the shot (projectile) that missed, or upon launching the projectile that misses a credit cost is deducted from the player but after the projectile misses all targets (e.g., hits the top of the screen and moves off the screen) then the credit cost that was deducted from the player in operation 201 is refunded to the player so that there is no net cost to the player for the miss. An optional predictive model can be used that upon the player initiating a shot (pressing a shoot button), the system would automatically be able to determine whether the shot would hit a target and if not then no credit deduction is made, and if it is determined that the shot would hit a target then the credit cost can be deducted from the player immediately after the shot is initiated but the award is not displayed to the player until the projectile actually hits the target.

Table VIII below illustrates an example of a shooter game utilizing the methods described herein and the skill factor computations set forth in Table VII. Note that the method utilized for this example utilizes the method illustrated in FIG. 7 (as opposed to FIG. 5 or FIG. 6), although it can be appreciated that any game can utilize any method described herein.

TABLE VIII

| Game Event | Skill factor | Award? | Award Model | Streak | p |
|---|---|---|---|---|---|
| Player starts | 0 | no | n/a | 0 | 0 |
| hit non-flying target | 0 | yes | 1 | 1 | 0 |
| hit non-flying target | 1 | yes | 1 | 2 | 0 |
| misses | 0 | no | n/a | 0 | 0 |
| hit a flying target | 3 | yes | 2 | 1 | 0 |
| hit a non-flying target | 1 | yes | 1 | 2 | 0 |
| Player gets shield powerup | n/a | no | n/a | 2 | 3 |
| hit a flying target | 5 | yes | 2 | 3 | 3 |
| Target crashes into shield | n/a | no | n/a | 3 | 0 |
| hit a flying target | 6 | yes | 3 | 4 | 0 |
| hit a non-flying target | 4 | yes | 2 | 5 | 0 |

The example illustrated in Table VIII will now be explained in more detail. The first game event is when the player starts playing, and the skill factor and streak are both initialized to zero. The second game event is the player hits a target (after launching a projectile/missile). According to Table VII, a non-flying target means the skill factor is equal to the streak (which is 0), then the award model is determined (using Table IV) based upon the skill factor (which would be Easy1 assuming the Easy difficulty level was chosen for this example), and then the streak is increased by one. The third game event is the player hits another non-flying target, which means the skill factor is equal to the streak which is 1, the award model is determined (using Table IV) which would be Easy1, and then the streak is increased by 1 (which now equals 2). The fourth game event is that the misses (launches a projectile which does not hit anything) and so the skill factor and streak are both set to zero. A miss is not an award generating event and so no award is generated (and no award model is needed). The fifth game event is that the player hits a flying target. The skill factor is equal to the streak plus 3 which is 3, and the award model (which is a function of the skill factor) is 2. The streak is now incremented by 1 to equal 1. The sixth game event is that the player hits a non-flying target the skill factor is equal to the streak (which is 1), and the award model is 1. The streak is now incremented by 1 to be 2. The seventh game event is the player gets a shield power-up. The shield power-up protects the launcher from an attack by a target (either the target crashing into the launcher/shield or a weapon fired by a target at the launcher/shield). When the shield power-up is active and the launcher is hit by a target, the launcher would not be destroyed as the shield protect the launcher. Getting a power-up is not an award generating event and does not affect the skill factor or the streak, but would set flag (variable) equal to p (or any other constant). Such a power-up could last for 30 seconds (or other time amount) or until the shield has been used (i.e., a weapon fired by the target hits the shield or a target crashes into the shield) which terminates the shield power-up. A shield power-up provides a shield around the launcher, so if a target (enemy also referred to as alien) shoots a weapon and hits the shield the shield would absorb the weapon and not damage (or destroy) the launcher. If a target flies down and hits the launcher the shield will also destroy the target and keep the launcher safe. The eighth game event is the player shoots a flying target, in which the skill factor is equal to the streak plus 3 (p) (2 plus 3 equals 5). The award model is Easy2 (based on the skill factor of 5). The streak is now increased by 1 to be 3. The ninth game event is a target crashes into the shield. This is not an award generating event and does not affect the streak. However, this terminates the shield power-up and as such it is no longer active, and p is now reset to zero (in all games, each game would initialize at the beginning of the game with p set to 0). In another embodiment, when a target crashes into the shield it can be an award generating event, and the shield can (or may not) remain in place. The tenth game event is the player hits (shoots) a flying target, which means the skill factor is equal to the streak plus 3. Since the streak is 3, the skill factor is 6 meaning the award model is now Easy3 (from Table IV). The streak is now increased by 1 to be 4. The eleventh game event is the player hits a non-flying target. The skill factor is equal to the streak which is 4 and hence the award model is 2 (Easy2). The streak is now increased by 1 to 5.

In a further embodiment, a balloon-popping game can be implemented utilizing the methods described herein.

Figure 9:
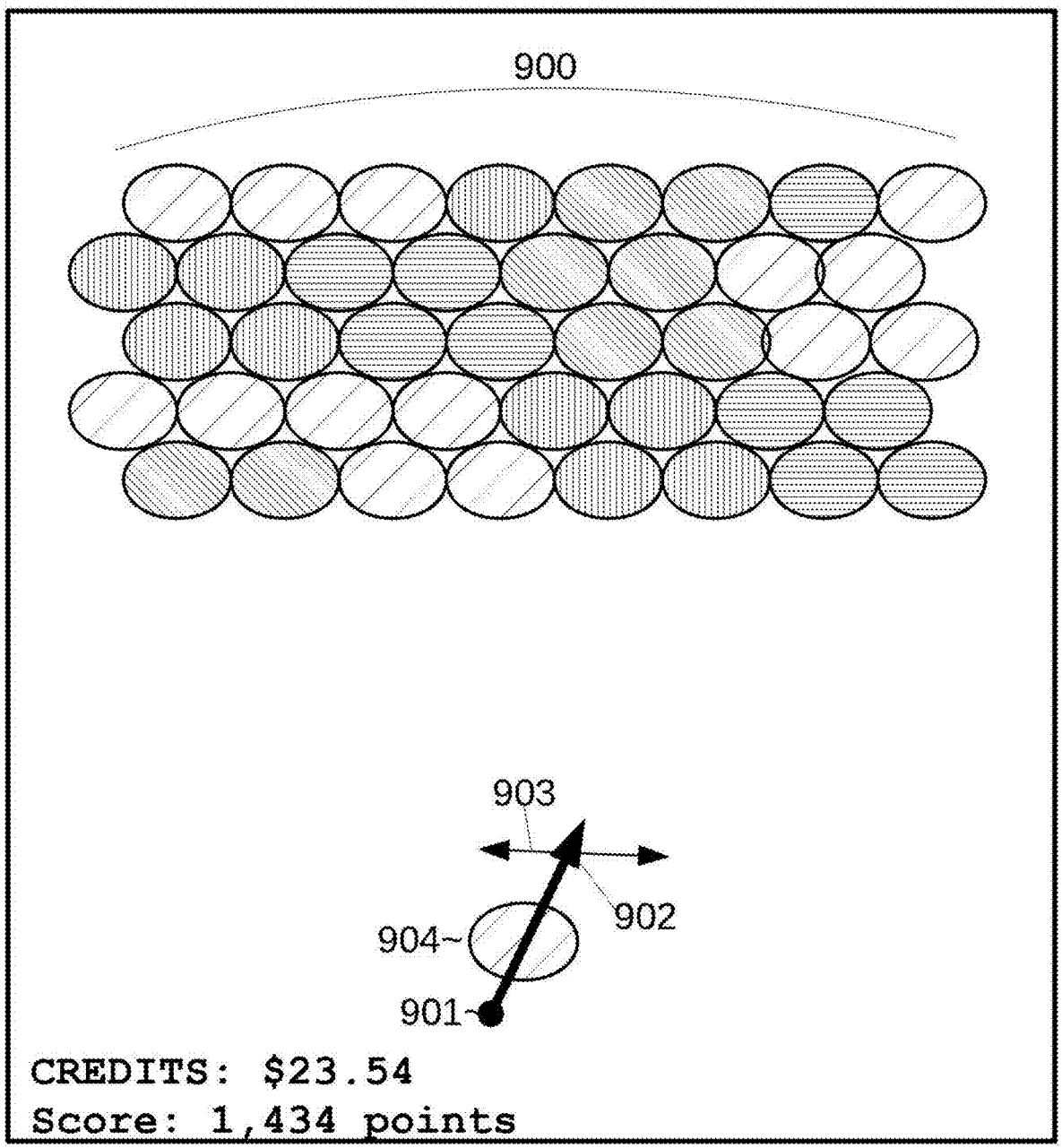
FIG. 9 is a drawing of an initial screen of a balloon popping game, according to an embodiment.

FIG. 9 is a drawing of an initial screen of a balloon popping game, according to an embodiment.

A set of balloons (targets) 900 is present, each balloon having a color. However, there is a limited set of potential colors (e.g., 4-10) as the goal of the game is to create sets of adjacent like-colored balloons. A launcher comprises a bottom point 901 and an arrow 902 which points to the direction a loaded balloon 904 will be launched. The player can aim the arrow 902 left and right as indicated in the left/right directional indicator 903 (which is not displayed in the game and is only used to illustrate the aiming of the arrow 902). The loaded balloon 904 is a balloon that will be launched when the player presses a launch button. The player can discern what color the loaded balloon 904 is so that the player can aim the launcher in an ideal direction in order to create a set of adjacent like-colored balloons. "Like-colored balloons" means balloons of the same color. Note that in FIG. 9 each color is represented by a different shading pattern. Note that on the bottom left of the game screen is a credit meter which shows that the player currently has $23.54 worth of credits. Also shown is a score meter which shows the player currently has 1,434 points. The points in the score meter are unrelated to the wagering aspect of the game and are for entertainment purposes for the player. Different game events could increase the player's score in the score meter, for example popping balloons could earn the player a certain number of points per balloon popped and dropping a certain number of balloons could earn the player a certain number of balloons per balloons popped. Note that the credit meter reflects the wagering results which incorporate a random number generator and hence the player could not predict what his awards (in credits) would be. In contrast, the score points in the score meter should be deterministic based upon the events that happen in the game. While there may be an inherent randomness as to how the game progresses (e.g., balloons in the set of balloons 900 can be random colors), an observer of the game should be able to determine the score in the score meter based upon each discrete event in the game since the points earned in the game are not computed based upon a random determination.

Figure 10:
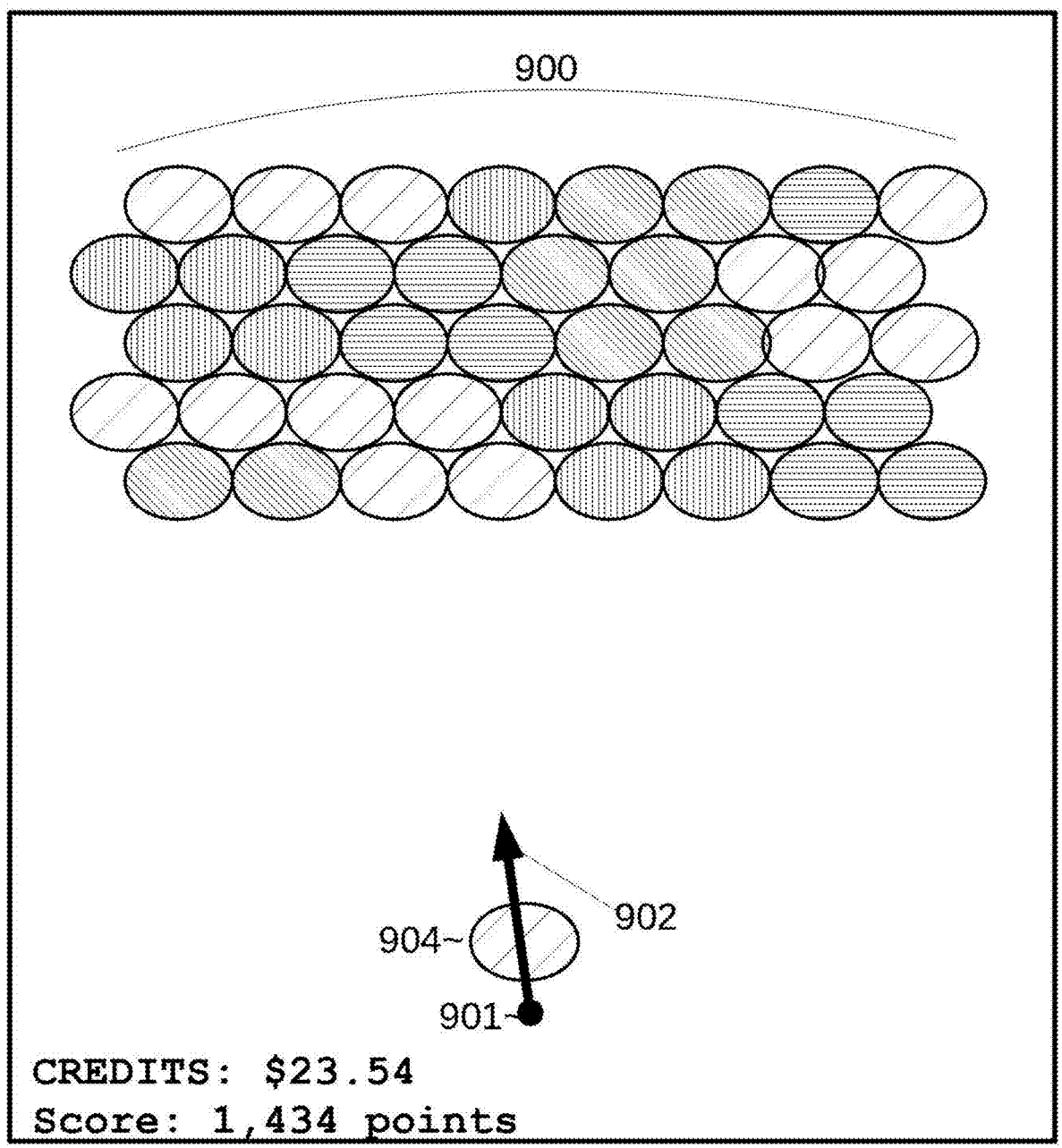
FIG. 10 is a drawing of a further screen of the balloon popping game showing aiming, according to an embodiment.

FIG. 10 is a drawing of a further screen of the balloon popping game showing aiming, according to an embodiment.

Note that the player has rotated the launcher to the left (the player can aim the launcher left/right (counterclockwise/clockwise) which will launch the loaded balloon 904 in that direction (where the arrow 902 is pointing).

Figure 11:
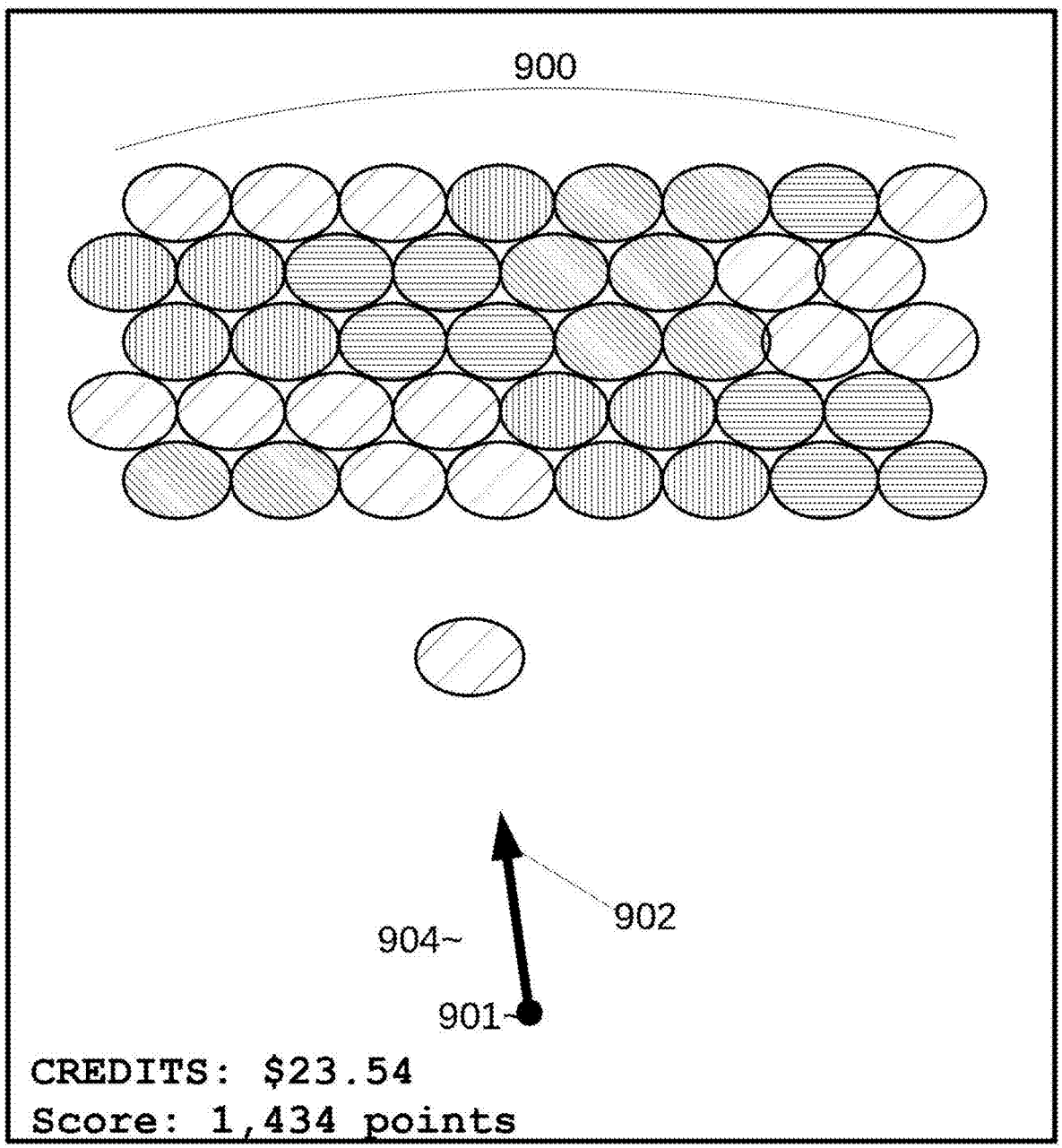
FIG. 11 is a drawing of a subsequent screen of the balloon popping game showing a launched balloon (projectile), according to an embodiment.

FIG. 11 is a drawing of a subsequent screen of the balloon popping game showing a launched balloon (projectile), according to an embodiment.

The loaded balloon 904 has now been launched (by the player pressing a button on the user interface). Note that the credit meter has been reduced by $1 because in this example the credit cost is $1 (one dollar). Note that in one embodiment, upon every shot (or other player game action) the credit meter is reduced by the credit cost, and if the shot does not result in an award generating event (award sequence) then the credit cost ($1) is refunded to the player (added back to the credit meter). In another embodiment, upon every shot (or other player game action), the credit meter is not affected and only when an award generating event occurs is the credit meter deducted by the credit cost and then the award sequence is initiated (the deduction of the credit cost and the award of any award can adjust the credit meter simultaneously). In another embodiment, a predictive model can be implemented upon the player taking a game action, the game could predict whether the game action would result in an award generating event (by evaluating at the trajectory, etc.) and if it is determined that the player action would not result in an award generating event then there would be no deduction from the player's credit meter and if it is determined that the player action would result in an award generating event then the player's credit meter would be deducted by the credit cost (either immediately upon the player game action such as a launch/shot or when the award generating event occurs).

Figure 12:
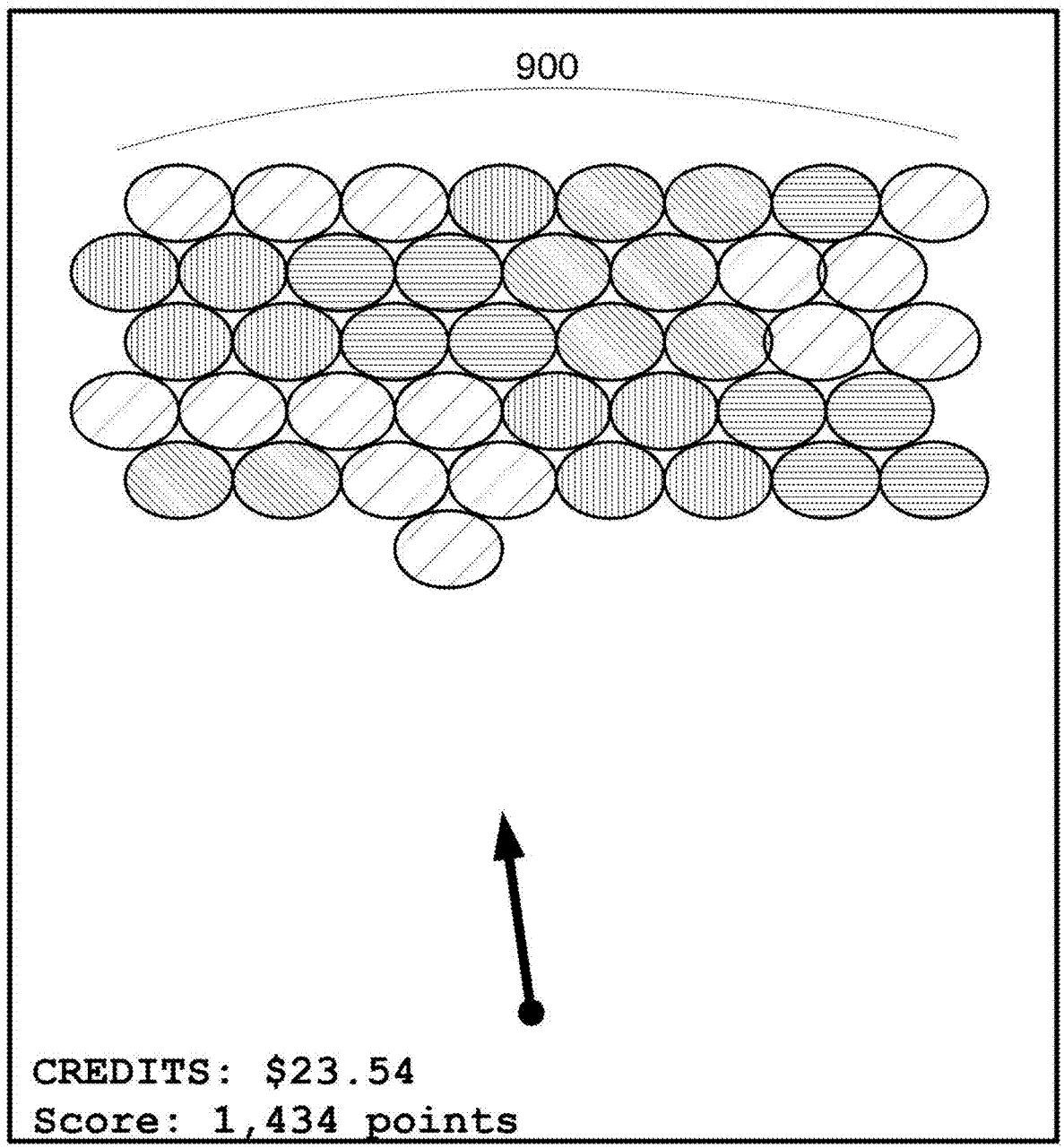
FIG. 12 is a drawing of a following screen of the balloon popping game showing a like placement of the launched balloon, according to an embodiment.

FIG. 12 is a drawing of a following screen of the balloon popping game showing a like placement of the launched balloon, according to an embodiment.

The player was successful in making a set of seven like-colored balloons. Note that the launched balloon will continue in its direction until it collides with other balloons in the set of balloons, in which the launched balloon will stop moving and stay where it is. Since this is more than two, they will now pop, and any balloons suspended beneath those popped balloons will start to fall. Note that when the launched balloon lands and makes a set of like-colored balloons, the set of like-colored balloons will include as many touching like-colored balloons as possible (all touching balloons) of that same like color. These (the initial set of like colored balloons greater than two) will pop are all called "pops."

Figure 13:
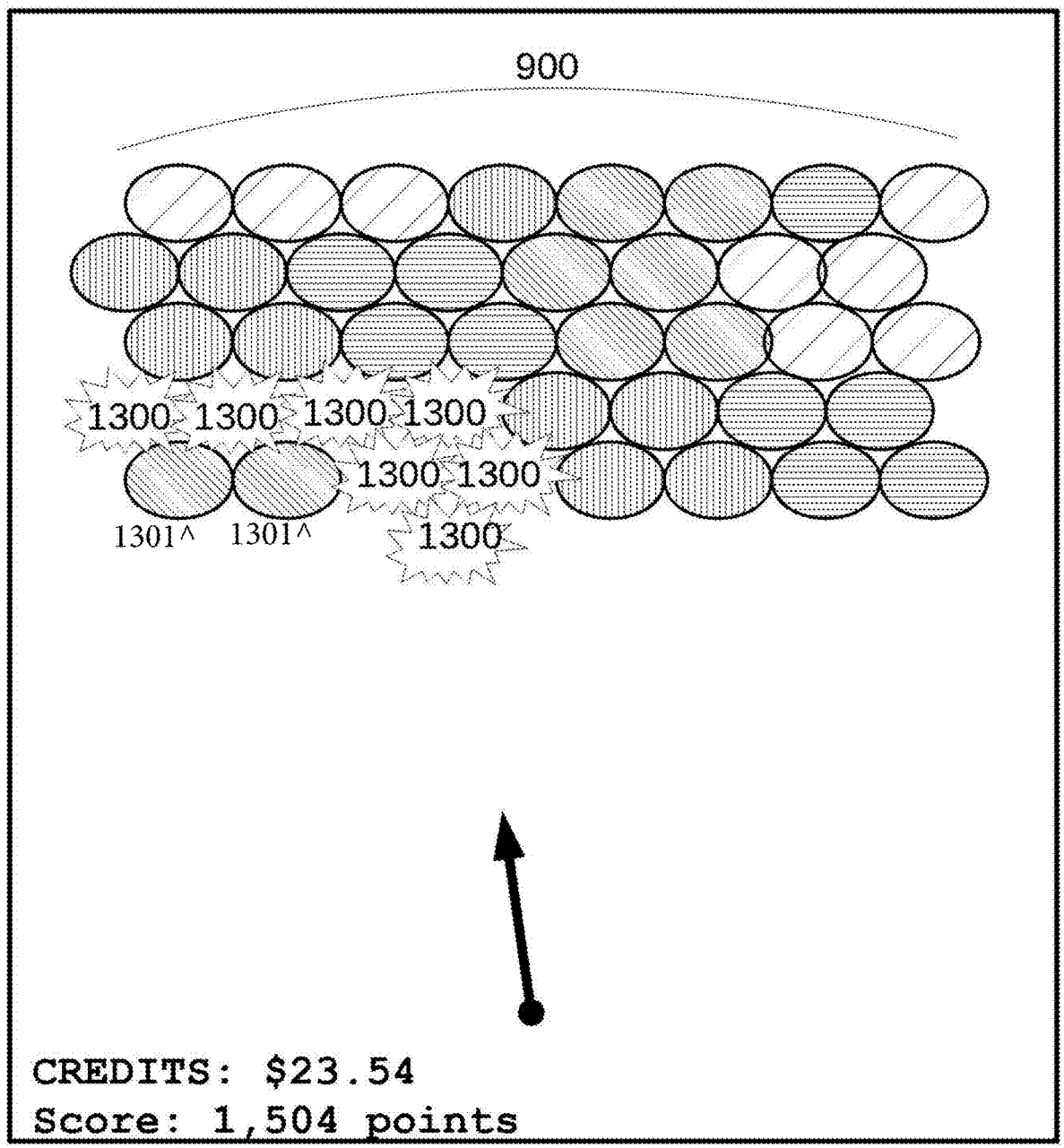
FIG. 13 is a drawing of an ensuing screen of the balloon popping game, showing pops popping, according to an embodiment.

FIG. 13 is a drawing of an ensuing screen of the balloon popping game, showing pops popping, according to an embodiment.

The launched balloon 904 has collided with the six other like-colored balloons which now pop and all of these seven like-colored balloons become pops 1300. The balloons adjacent to the pops 1300 are different colored than the balloons that are now pops 1300 and so these do not become pops. However, a special balloon may always pop when a balloon adjacent to it pops or a special balloon can have a "wild" color and will take on any color which would be most advantageous to the player.

Note that two other balloons 1301 are suspended under the pops 1300 (have no uninterrupted connection to the ceiling). Since balloons 1301 are no longer supported by the arrangement of balloons, those balloons 1301 become drops 1401 and fall (drop) straight down.

In an embodiment, the score meter is updated at this stage. Since there are seven pops and two drops here, this can award the player 70+40=110 points (10 times the number of pops+10 times 2 to the power of the number of drops).

Figure 14:
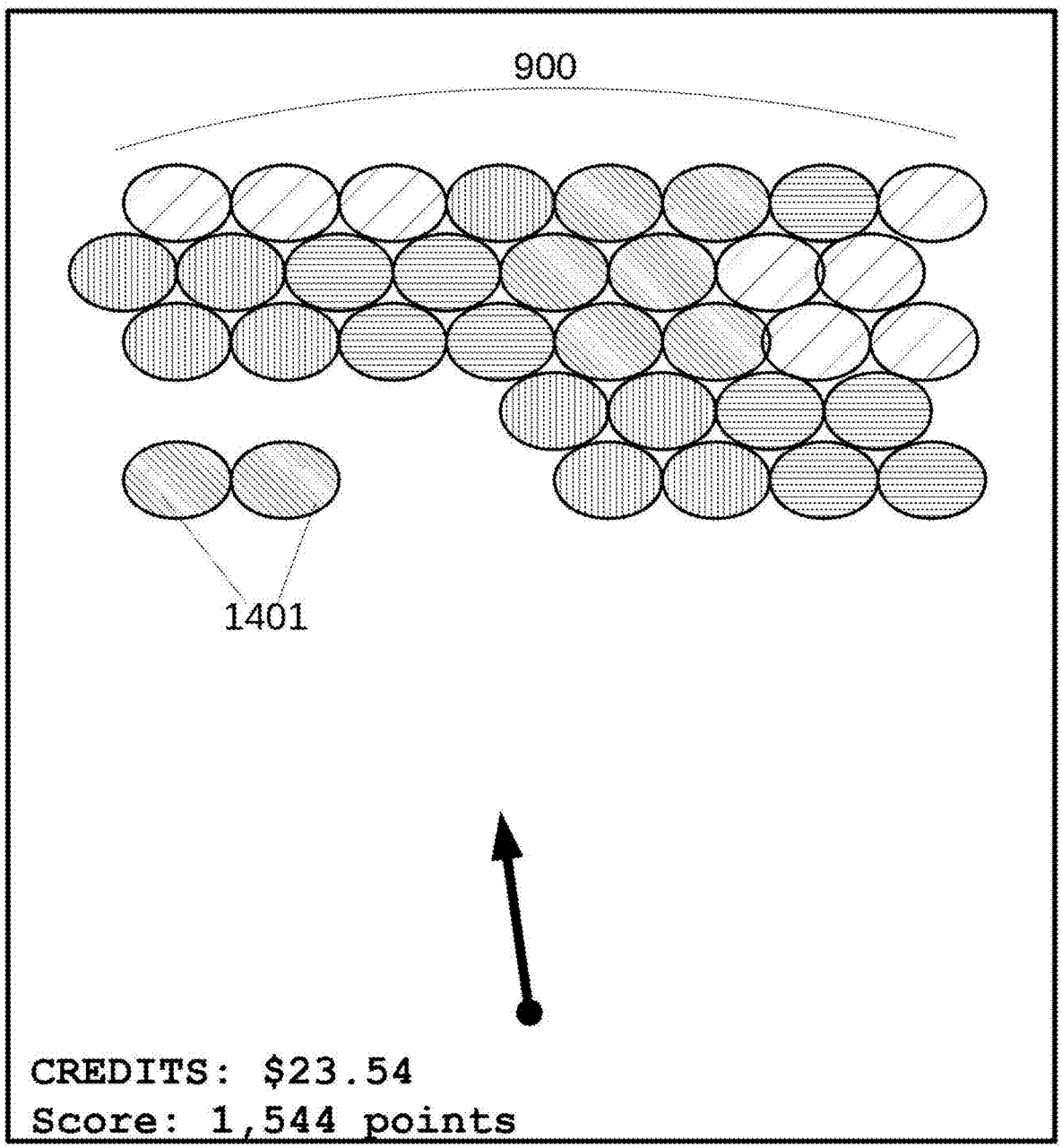
FIG. 14 is a drawing of a continuing screen of the balloon popping game, showing the pops removed, according to an embodiment.

FIG. 14 is a drawing of a continuing screen of the balloon popping game, showing the pops removed, according to an embodiment;

The two drops 1401 fall straight down.

Note that it is now determined that this is an award generating event and all the information is needed to determine the award (e.g., the number of pops and drops, etc.) Thus, now the proper award model can be determined and initiated. In this example, the award model determines and returns that the player has won $10, and hence the player's credit meter is now increased by $10. Since the player paid $1 for the launch (which resulted in the award generating event), and the player won $10, the player has a net profit of $9 for this shot/launch.

In an embodiment, rather than updating the score earlier as described above, the score may be updated at this stage. Since there are two drops and seven pops, the game can award 110 points. As known in a prior art game, D drops can be worth $10*2^D$ points (which is 40 in this case), and P pops can be worth $10*P$ points (which is 70 in this case) and hence this sum can be added to the point meter.

Figure 15:
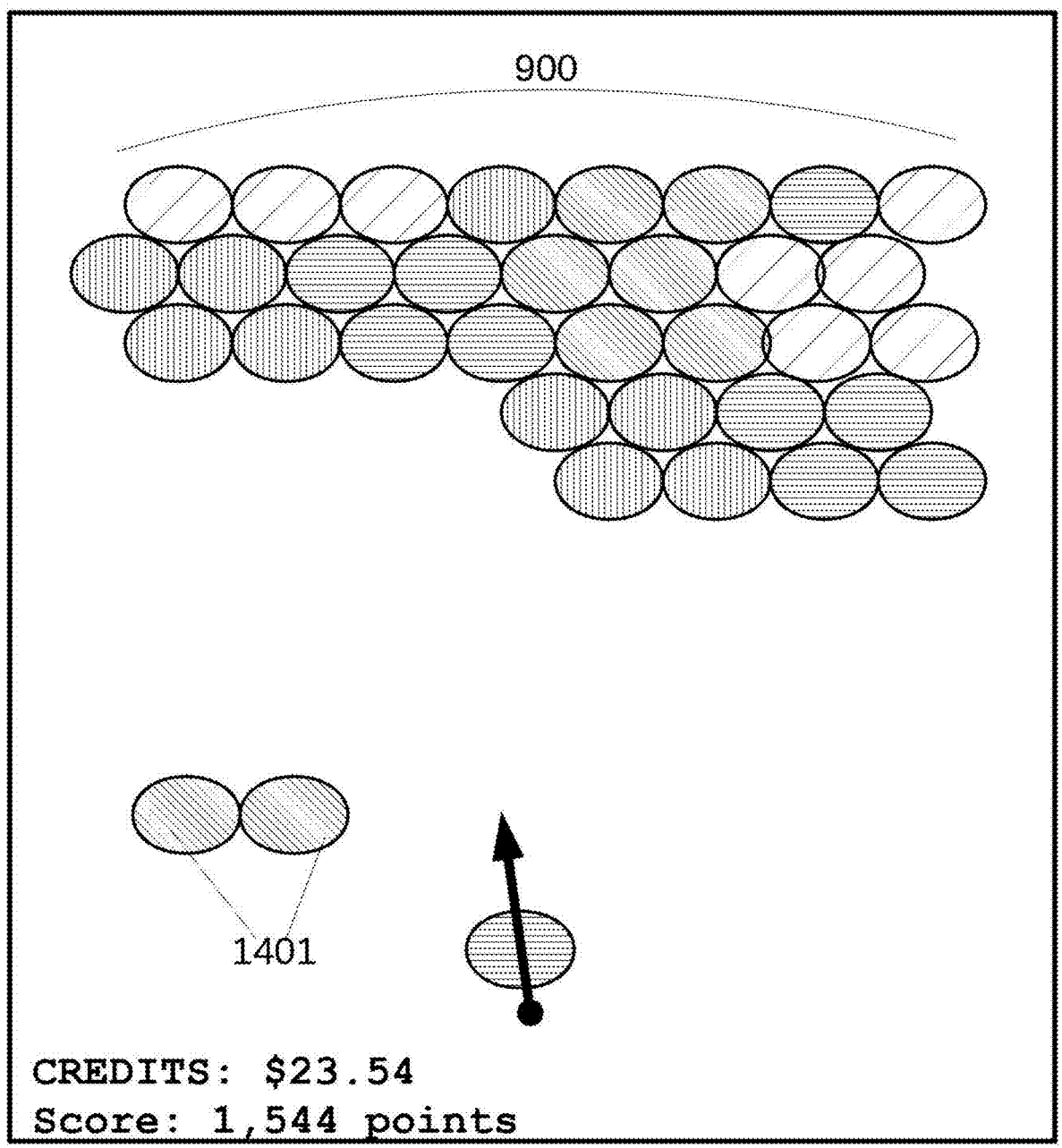
FIG. 15 is a drawing of a successive screen of the balloon popping game, showing the dropped balloons (drops) falling, according to an embodiment.

FIG. 15 is a drawing of a successive screen of the balloon popping game, showing the dropped balloons (drops) falling, according to an embodiment.

All of the pops (seven) and drops (two) are removed from the screen. Note that a new loaded balloon is inside the arrow. Each new loaded balloon can be a random color. Alternately, the loaded balloon color can be predetermined using a predetermined order, or can be dynamically selected based on the state of the game.

Figure 16:
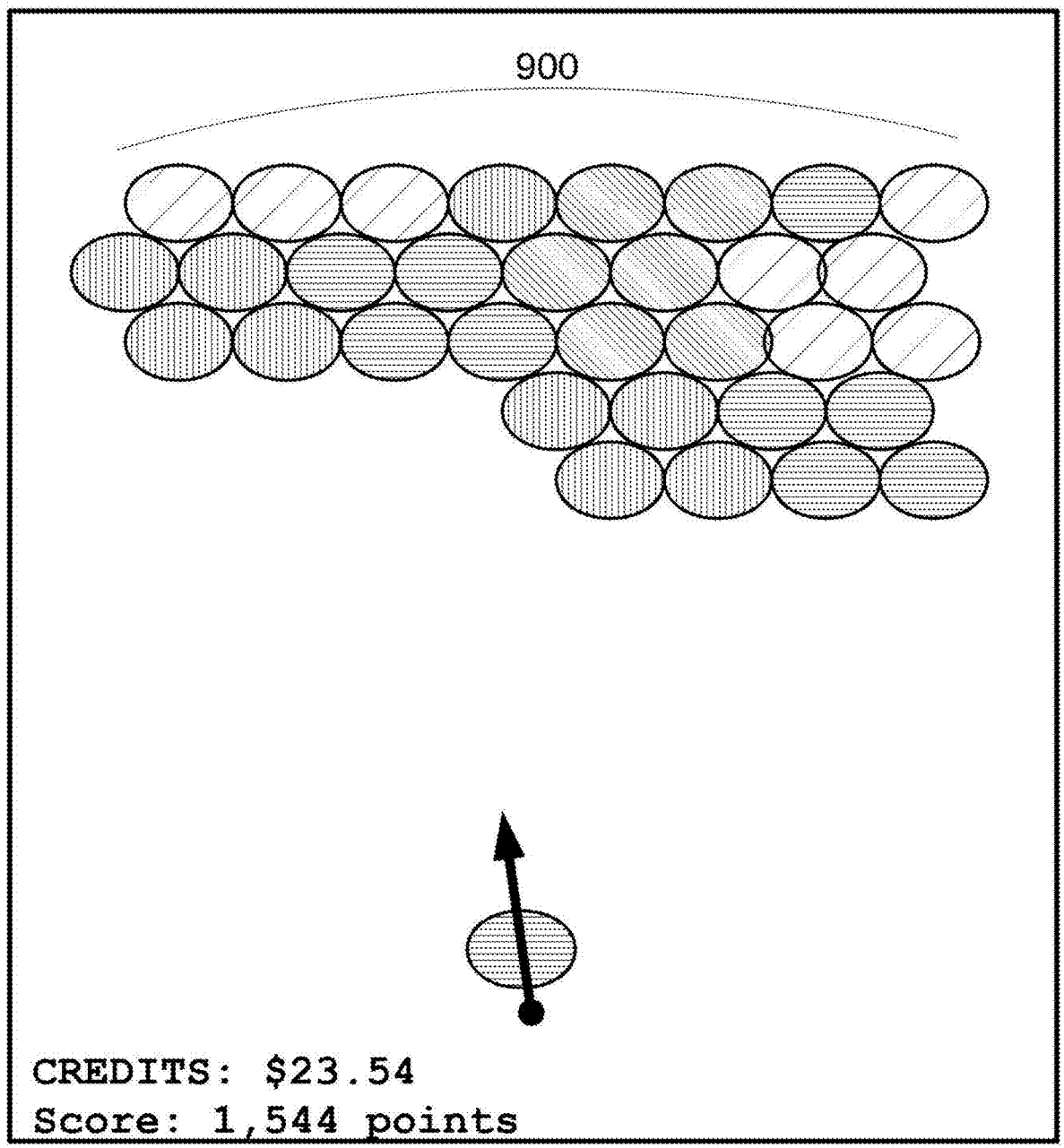
FIG. 16 is a drawing of a consecutive screen of the balloon popping game, showing the dropped balloons removed from the game screen, according to an embodiment.

FIG. 16 is a drawing of a consecutive screen of the balloon popping game, showing the dropped balloons (drops) removed from the game screen, according to an embodiment.

Table IX below is an example of how the skill factor would be computed for each game event for a balloon popping game. Note that each shot is independent and the skill factor is reset to zero on each shot. Min (6,N) is a function that takes the minimum of the two parameters, wherein N is the number of balloons that were dropped (drops). Drops are the balloons that were not initially popped but that are now suspended and therefore are (after the pops pop) unsupported. When there is a set of like-colored balloons after the recent shot, all of these like-colored balloons will pop and cause any other unsupported balloons to drop ("drops"). Thus, for example, it is possible that a player can launch the loaded balloon which collides with two balloons of the same color as the loaded balloon, and all three of these balloons will pop (3 pops) and if there are two suspended (isolated) balloons hanging, all of those will drop (2 drops) for a total of 5 balloons that are removed from the game screen including the balloon that was just launched. Note that there can be special balloons which may have special powers (also referred to as "power-up balloons"). The special balloons can have a different appearance (e.g., glowing, etc.) so they can be identified as special balloons. Also note that a "bank shot" is when the player rebounds their shot off the left or right wall. There is a left wall and a right wall on the game screen, and when the balloon that is being shot hits the left wall or the right wall it will rebound in the opposite direction. Thus, each time the player makes a bank shot (rebounds off of the left wall or the right wall) which results in a pop, as per Table IX the skill factor would be increased by 3. "Pops" (popped balloons) are those balloons in which launched balloon lands in an area which creates more than two like-colored balloons, which then all pop. "Drops" are those balloons connected to the ceiling only by balloons that popped, which drop down after the popped balloons pop.

In a typical balloon-popping game, balloons in the arrangement are directly "connected" to other adjacent balloons, or alternately to an upper border of the arrangement (e.g., the ceiling.) Balloons may be arranged into any structure, and along any type of grid (e.g., a square grid, a hexagonal grid). An unpopped balloon will remain in the arrangement so long as it is connected, via one or more sequentially connected balloons, to the ceiling. If one or more balloons are popped that are the last remaining connection(s) to the ceiling for a set of balloons, those balloons will have become disconnected (suspended) from the ceiling and will fall down. Such falling balloons are known as dropped balloons or "drops." As long as a balloon is connected to the ceiling (by virtue of a being connected to the ceiling via touching a chain/group of adjacent balloons of any color), it will remain in its original place regardless of whether any adjacent or nearby balloons are popped. Thus, it is possible for a balloon to remain in place while surrounding balloons have been removed. When a balloon(s) is popped, either as a result of a like-color match or as a result of a special balloon effect, any balloons relying on that popped balloon(s) for their connection to the ceiling will drop. A connection to the ceiling is a chain/group of touching (adjacent) balloons reaching the ceiling regardless of the colors of balloons in the chain. In many balloon-popping games, the player's score increases significantly (e.g., exponentially) as the number of dropped balloons for a given shot increases. Thus, a skilled strategy is to "hang" multiple unlike balloons underneath a set of two like-colored balloons so those unlike balloons are not otherwise connected to the ceiling. Then, when the like-colored balloon appears in the launcher, aim for the two like-colored balloons to make a matching set of three balloons. The three balloons will pop and all the balloons that had been previously hung or suspended by the player will now drop, leading to a high-scoring play.

TABLE IX

| Game Event | Skill Factor Computation | AGE? |
|---|---|---|
| New shot | skill factor = 0 | no |
| N dropped balloons | skill factor += min (6,N) | yes |
| Pop any special balloons | skill factor += 3 | yes |
| Pop any after bank shot | skill factor += 3 | yes |

For example, if the player makes a shot which results in three dropped balloons, then the game event would be "N dropped balloons" and the skill factor would be increased by min (6, N) which would be 3 (because 3 is small than 6). If the player dropped 6 balloons, then min (6, N) would be 6. If the player dropped 7 balloons, then min (6, N) would be 6. Min(x,y) is a known mathematical library function which takes the smaller of the two arguments (parameters) x and y. Thus, min (6, N) could never be larger than 6. Note that any of the events in Table IX can happen on the same shot. In other words, the player can initially pop a special balloon, which would increase the skill factor by 3, and which may cause five other balloons to drop, further increasing the skill factor by 5. If the initial shot that popped the three balloons was a bank shot, then the skill factor would also be increased by 3 by virtue of the shot being a bank shot. Thus, a bank shot that initially hit three balloons and one of the initial balloons was a special balloon and then the pops resulted in 2 drops, then this would have a skill factor of 3 (for the bank shot)+3 (which is for the special balloon being popped)+2 (which is min (6, 2) in which 2 is the dropped balloons)=8. Note that special balloons can have a color of "wild" meaning they can match the color of adjacent balloons, so for example, if an adjacent balloon is red and the launched balloon is red, the special balloon which is adjacent to the red can take on the color of red and as such all three balloons (including the special balloon) would pop. Special balloons can also have a unique appearance than the other colored balloons (e.g., it can glow, etc., but not match the color/appearance of non-special balloons). Special balloons can also result in other effects, for example, popping all of the balloons on the board matching the color of the launched balloon; popping all balloons in a horizontal line; popping all balloons adjacent to the special balloon regardless of color, etc.

Table X below illustrates one example of how the balloon popping game could be implemented using the rules set forth in Table IX. Note that all shots in Table X result in an award. Once again, it is important to note the distinction between pops and drops. Pops are the number of balloons that are popped upon the initial collision of the launched balloon and the set of balloons. Drops are balloons that were not in the original set of popped balloons (were not like-colored balloons that are adjacent to the launched balloon) but are suspended (not connected to the ceiling) and hence the "drops" are knocked down by the pops (it does not matter what color the drops are). After the reaction based on the most recent shot is completed, both the pops and the drops have been removed from the board.

TABLE X

| Shot # | shot description | Skill factor | Award Model |
|---|---|---|---|
| 1 | bank shot, pop 3, drop 1 | 4 | 2 |
| 2 | pop 5, drop 0 | 0 | 1 |
| 3 | pop 3, drop 8 | 6 | 3 |
| 4 | pop special, drop 2 | 5 | 2 |
| 5 | pop 3, drop 1 | 1 | 1 |

In Table X, shot 1 was a bank shot with adds 3 to the skill factor and dropped 1 which adds 1 to the skill factor (Min (6, 1)) equals 4. From Table IV, a skill factor of 4 would result in award model 2. For example, if the difficulty level was set to Hard, then award model 2 would be the "Hard2" model. Regarding shot 2, the skill factor is 0 because the pops themselves are not used in the computation of skill factor. This results in award model 1. Regarding shot 3, the 3 pops don't matter but the 8 pops are factored in by using (min 6, 8) which results in 6, meaning the skill factor for this example (shot 3) is 6 (resulting in award model 3 from Table IV). Regarding shot 4, popping the special balloon results in adding 3 to the skill factor and min (6, 2) is 2, resulting in the skill factor being 5, resulting in award model 2. Regarding shot 5, the 1 dropped ball translated to min (6, 1) which is 1 meaning the skill factor is 1 resulting in award model 1. Note that each new shot has its skill factor reset to zero before the skill factor is computed for that shot.

Note that any time (in any embodiment) that an award model is initiated, the credit cost is first deducted from the player's credit meter in order to pay for the ability to potentially earn an award (see FIG. 2).

Figure 17:
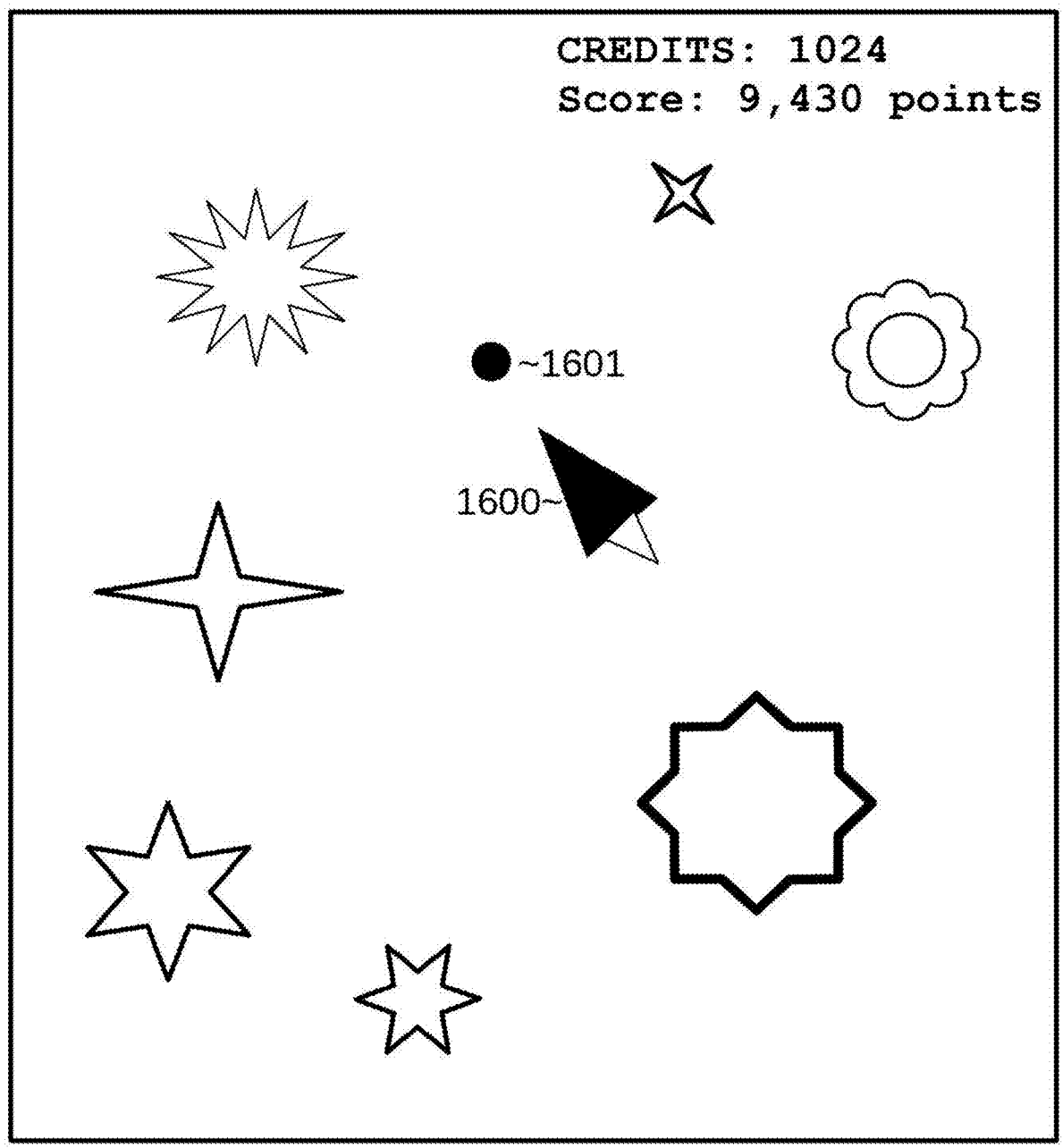
FIG. 17 is a drawing of a boulder shooting type game, according to an embodiment.

FIG. 17 is a drawing of a boulder shooting type game, according to an embodiment.

The ship 1600 (player's ship) is controlled by the player, who can rotate the ship clockwise and counterclockwise using a user interface device such as a joystick or buttons. The player can initiate a thrust by pressing a button which propels the ship 1600 forward. The ship can shoot a missile/projectile 1601 in the direction the ship is pointing (although the missile 1601 would typically travel at a faster speed than the ship 1600). Each item on the game screen (boulders, ship 1600, missile 1601, etc.) has its own vector (velocity and direction). The game screen typically has "wrap-around" meaning there are no borders on the screen and going off one side of the screen makes the object reappear on the opposite side. The player's goal is to destroy all of the boulders, upon which a new level would start. Each time a (non-smallest) boulder is hit with a missile, the boulder would break into smaller boulders until a smallest boulder (an "atom" boulder) is generated upon which when a smallest boulder is hit with a missile it would be destroyed (disappear from the screen) without breaking into further boulders.

Tables XI and XII below is one example illustrating how the skill factor can be computed. K in Table XI refers to the kill amount (number of kills) for the trailing 5 seconds (or other amount of time based on predetermined parameters programmed into the game). Given K, the skill factor can be determined by referring to Table XI (of course this is just one example other such mappings can be utilized as well).

TABLE XI

| Evaluation | adjustment |
|---|---|
| 0 ≤ K < 7 | skill factor = 0 |
| 7 ≤ K < 15 | skill factor = 1 |
| 15 ≤ K < 25 | skill factor = 3 |
| 25 ≤ K | skill factor = 5 |

Table XII illustrates how the skill factor (after being determined utilizing Table XI) can now be adjusted based on events in the game. For example, if the award generating event that caused this determination to be made (the last award generating event) was when an alien was destroyed (as opposed to a boulder), then the skill factor can be augmented by 3. If any power-up is active, then the skill factor can be augmented by 3. If the player's ship is moving (as opposed to being stationary on the game screen) the skill factor can be augmented (increased) by 2.

TABLE XII

| Game Event | Adjustment |
|---|---|
| Destroy alien? | skill factor += 3 |
| Power up active | skill factor += 3 |
| If ship is moving | skill factor += 2 |

In addition to flying boulders, there can also be a flying alien that flies around the game screen which appears at random or predetermined time intervals. Each alien destroyed (by hitting it with once a missile) in the trailing five seconds would increase the skill factor by 3. Each power up (power ups can appear randomly on the game screen) collected (by the player ship colliding with the power-up) in the trailing five seconds would also increase the skill factor by 3. The kill amount (K) is the number of boulders destroyed over the preceding 5 seconds. A boulder is destroyed when it is hit with a missile launched (at the player's initiative) from the player's ship. Typically, one hit from a missile is all it takes to destroy a target (e.g., boulder, alien, or other target in any game described herein.) Typically, each such destroyed target would initiate an award generation sequence as described herein. Note that the more targets a player hits in a given time, the better his/her skill factor will be. Thus, if the player delays while hitting a target, this can have a "time decay" effect of worsening the player's skill factor. Thus, in this embodiment, the player should ideally utilize "rapid fire" techniques to achieve as many hits (award generating events) as possible in a short period of a time (e.g., 5 seconds, 10 seconds, etc.)

If the player's ship collides with a boulder, an alien, or a missile fired from the alien, the player's ship would be destroyed. The player may be given a finite number of ships (lives) such as three before the game may end (unless the player wants to continue play of the game).

Figure 18:
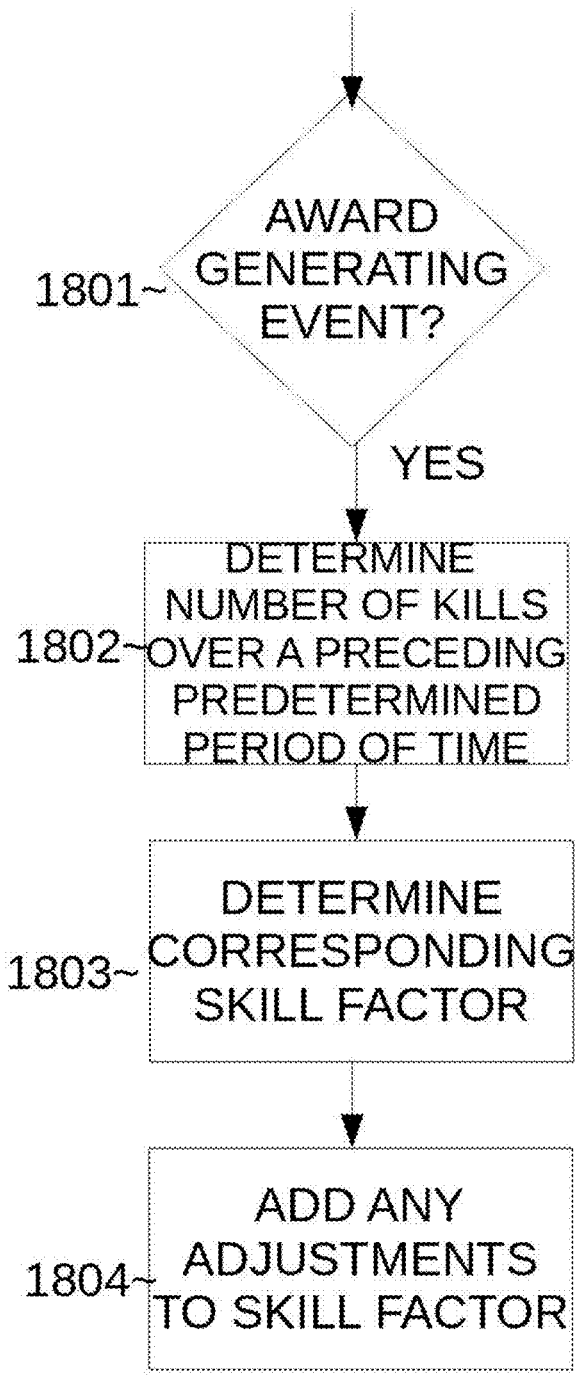
FIG. 18 is a flowchart illustrating an exemplary method of computing a skill factor utilizing a time decay, according to an embodiment.

FIG. 18 is a flowchart illustrating an exemplary method of computing a skill factor utilizing a time decay, according to an embodiment.

The method can begin with operation 1801, which determines whether an award generating event has taken place (e.g., an object being destroyed). If not, then there is no need to continue to operation 1802. If an award generating event has taken place, then the method proceeds to operation 1802.

In operation 1802, it is determined the number of kills that have taken place over a preceding predetermined period of time. The period of time can be five seconds (or other such duration). Preceding means immediately before the award generating event of operation 1801. A kill can be defined as only whenever any object (e.g., boulder, alien, etc.) is destroyed (e.g., by a missile shot by the player's ship). A kill can also be defined as only award generating events. If the player has not made any kills in the previous five seconds then the number of kills is zero. Typically, all kills are treated equally (worth 1 points), so 3 kills in the previous five seconds would be computed as 3 kills (3 points) regardless of what types of kills were made (alien ship, large boulder, small boulder, etc.)) In another embodiment, different targets can be treated as more or less valuable for the purposes of computing K (some targets are worth more kills than other targets). The number of kills can typically include the award generating event (e.g., the destroyed object) that resulted in the method in FIG. 18 being performed (e.g., the most recent kill), although in another embodiment the most recent kill is not included in the number of kills in the preceding predetermined period of time. "Kill" can also be synonymous with "destroyed object."

From operation 1802, the method proceeds to operation 1803, which determines a corresponding skill factor based on the number of kills from operation 1802. A table can be used (e.g., Table XI) to look up a skill factor given the number of kills.

From operation 1803, the method proceeds to operation 1804, which adds any adjustments to the skill factor determined in operation 1803. This can be done by using a table such as Table XII, and for all of the listed game events that have occurred immediately prior to the award generating event (in operation 1801), the skill factor can be adjusted accordingly.

Once the skill factor has been computed in operation 1804, then it can be used to determine the respective award model, which is called to determine if there is a resulting award that would be added to the player's credit meter.

Note in the boulder destroy game, a player's score can also be outputted in a score meter. As discussed herein, the score meter (which typically starts at 0) is different from the player's credit meter and is intended for social and entertainment purposes. For example, with regard to the score displayed on the score meter, every boulder destroyed can earn 50 points (except for atom (smallest) boulders which could earn 75 points) and all alien ships destroyed can earn 100 points. This is an independent computation from determining the credits and awards as described herein. If the current game being implemented for wagering is modelled after a previous non-wagering commercial game, then the same scoring model can be used for the score meter. In this way, the scoring methodology used to determine the player's score will be familiar to the player. The score displayed on the score meter has no effect on the player's cashout and the score is only used for non-wagering purposes.

Video games can require manual dexterity on the part of the player in order for the player to perform better on the game. For example, shooting targets in real time may require fast hand-eye coordination in order for the player to operate the controls of the video game and successfully shoot targets. Features described herein serve to reward skilled players while playing video games adapted for wagering by recognizing skillful play and rewarding the skillful play by providing the player with a relatively better (e.g., higher return to player) award model. An unskilled player can play the video games and enjoy them and win credits (redeemable for real cash/money), however a skilled player can fare better (get better award models) than unskilled players. This does not mean that a skilled player will always win more than an unskilled player, as the award models incorporate random numbers and it is possible unskilled players can win more than skilled players. However, in the long run, skilled players should fare better than unskilled players using methods described herein.

Figure 19:
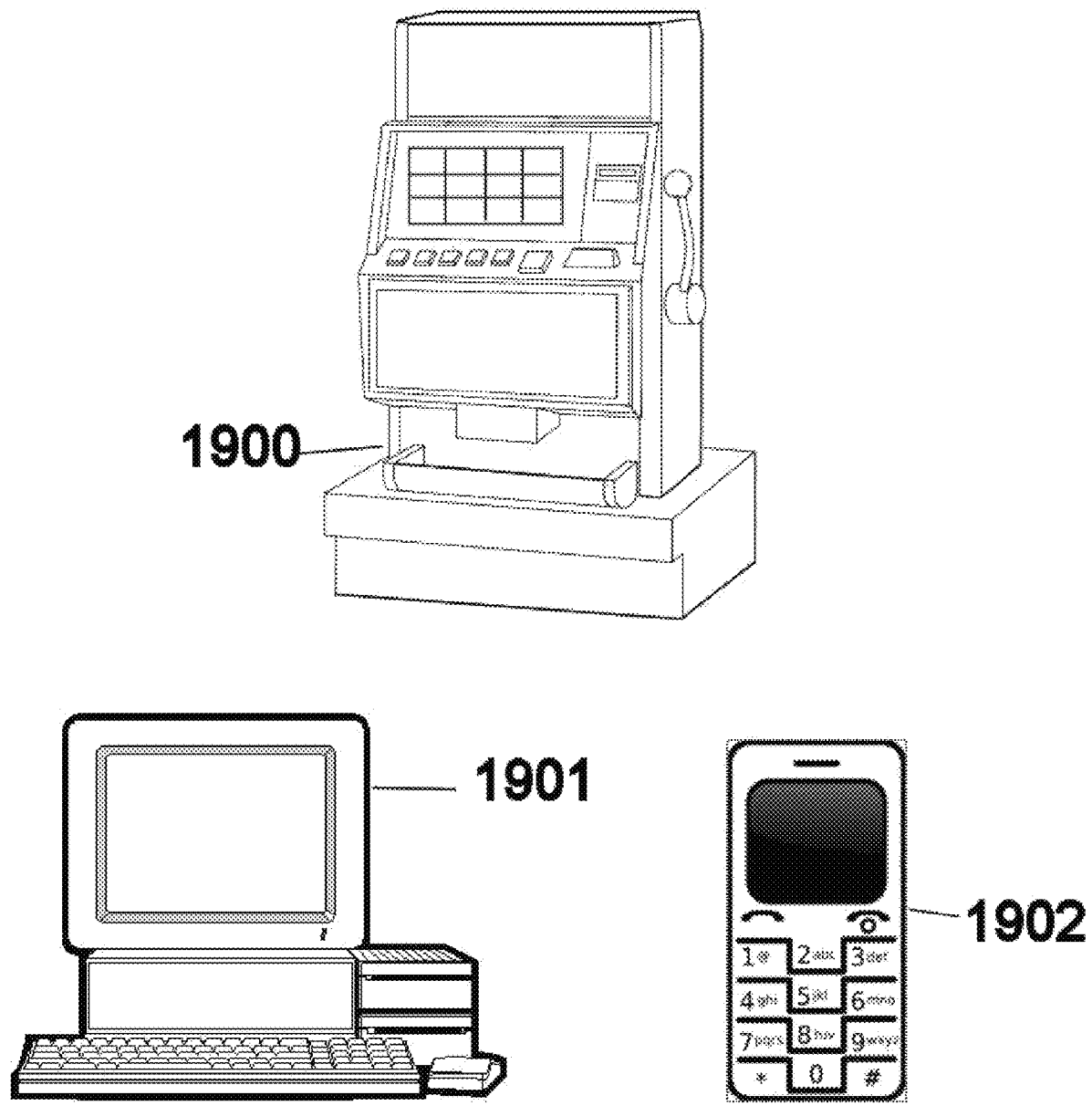
FIG. 19 is a drawing illustrating numerous apparatuses that can play the game described herein, according to an embodiment.

FIG. 19 is a drawing illustrating numerous apparatuses that can play the games described herein, according to an embodiment.

The games described herein can be played on an electronic gaming machine 1900 that can be found in brick and mortar casinos. Cash (or cashless vouchers) can be inserted into the machine 1900 using a bill acceptor (also known as bill validator) which credits the machine with a respective amount of credits which can then be used to play the game, and winnings are paid out in the form of credits which can then be cashed out for cash or a cashless voucher that can be redeemed for cash at a redemption kiosk (another machine where a player can insert a cashless voucher and the machine automatically validates the cashless voucher and dispenses the appropriate amount of cash). The methods described herein can be programmed on a software module pre-installed on the slot machine 1900 or can be downloaded to the electronic gaming machine 1900 from a central remote server, or a combination of the two paradigms.

Electronic gaming machines are subject to regulatory approval and must undergo a rigorous testing and approval process with the state regulators before they can be approved for use in a casino. Such testing includes software verification, random number generation verification, regulatory compliance verification, game recall testing, power failure/recovery testing, minimum internal controls (MICS) compliance verification, and other testing as is known in the industry.

The methods described herein can also be played on a computer 1901 such as a personal computer, laptop, etc. The game can be downloaded to the computer 1901 and stored locally on the computer 1901. Alternatively, the computer 1901 can have an internet connection (not illustrated) so that the game can be served from a remote location and player and displayed on the computer 1901. For example, the game can be played on an online casino (wherein the player can wager for real money using a credit card or other deposit method, where legal) in which the results are determined on a remote server and transmitted to the computer 1901 so that the computer displays the results.

The game described herein can also be played on a cell phone 1902 or any other type of portable device, such as a tablet computer, etc. The portable device can implement any of the paradigms described herein with respect to the computer 1901 (e.g., online casino, etc.)

Figure 20:
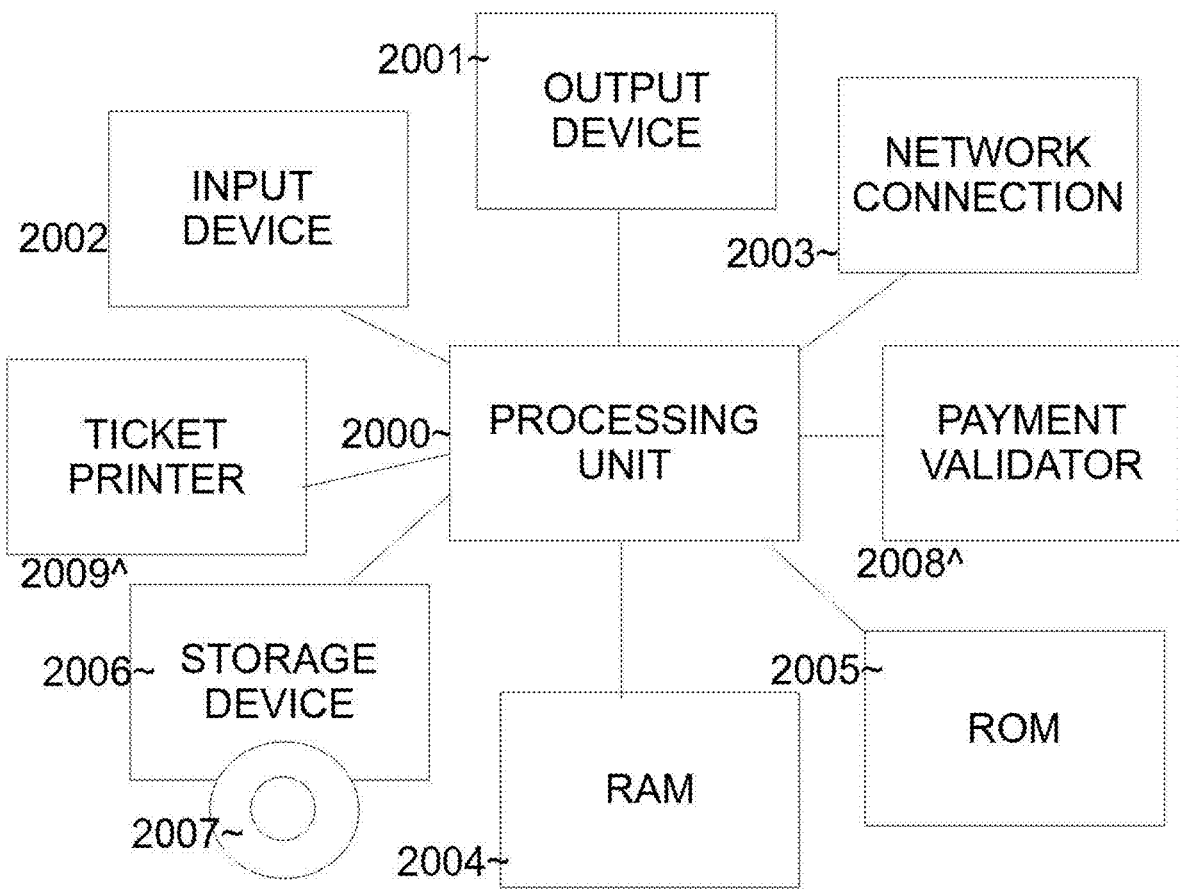
FIG. 20 is a block diagram illustrating exemplary hardware that can be used to implement the game described herein, according to an embodiment.

FIG. 20 is a block diagram illustrating exemplary hardware that can be used to implement the game described herein, according to an embodiment. The hardware in FIG. 20 can be used to implement a computer implementing the game described herein and/or a server that is serving the game to a computer which is displaying the game to a player. The hardware can also be, for example, an electronic gaming machine (EGM) used in casinos such as a video slot machine. The hardware can also be a personal computer, playing the game using the Internet at an Internet casino for real money. The hardware can also be any computing device, such as a cellular phone, tablet, etc., and the methods described herein can be installed as software (e.g., an app) on the device. The hardware can also be any other type of device, working individually or in conjunction with other devices.

A processing unit 2000 (such as a microprocessor and any associated components) is connected to an output device 2001 (such as an LCD monitor, touch screen, audio speaker, CRT, etc.) which is used to display to the player any aspect/output/state of the method, and an input device 2002 (e.g., buttons, a touch screen, a keyboard, dial/knob, trackball, joystick, mouse, etc.) which can be used to input from the player any decision/input made by the player. All decisions by the player (e.g., moving their ship/player/icon etc., shooting, jumping, and any other player decision) can be input to the processing unit 2000 via the input device(s) 2002. There may be multiple input and output devices. All aspects of the game and game states can be output on the output device 2001, and all player decisions during the game can be received by any one or more of the input devices 2002. Typically, the processing unit 2000 (and/or a graphics processor) also controls all of the computer generated animation used to display the happenings in each game. All methods/features described herein can be performed by the processing unit 2000 by loading and executing respective instructions programmed to perform such methods/features. Multiple such processing units can also work in collaboration with each other (in a same or different physical location). The processing unit 1800 can also be connected to a network connection 2003, which can connect the electronic gaming device to a computer communications network such as the Internet, a LAN, WAN, etc. The processing unit 2000 is also connected to a RAM 2004 and a ROM 2005. The processing unit 2000 is also connected to a storage device 2006 which can be a disk drive, DVD-drive, CD-ROM drive, flash memory, etc. A non-transitory computer readable storage medium 2007 (e.g., hard disk, CD-ROM, etc.), can store a program which can control the electronic device to perform any of the methods/features described herein and can be read by the storage device 2006.

In some embodiments, especially EGM embodiments in casinos, the processing unit 2000 can also be connected to a payment validator 2008. The payment validator can be a bill acceptor (also known as bill validator) which accepts currency (in a slot), identifies it as being valid (typically by using an optical scanner), and then credits the inserted bill amount to the machine (for example inserting a $10 bill will credit the machine with $10 in credits). The bill acceptor can also accept cashless tickets as part of a "ticket-in-ticket-out" system, in which tickets (cashless vouchers) have cash value and can be inserted into the payment validator 2008. The validator 2008 validates the ticket (typically by optically scanning a bar-code), communicating electronically with a casino database to verify the ticket is authentic and unredeemed, and once so verified then crediting the machine with the respective amount of credits. The payment validator 2008 can also include a card reader which can read cards (e.g., with a magnetic stripe, smart chip, or other electronic encoding) so that an account number can be accessed. The cards can be a credit card, player loyalty card, specific casino payment card, or any card that can provide electronic access to a monetary amount owned by the player (owner of the card) which the player can utilize for depositing money and then playing the machine. If such a card is used, then the player can optionally enter (using a keypad) an amount the player wishes to withdraw from the account associated with the card to credit to the machine.

In some embodiments, especially EGM embodiments inside casinos, the processing unit 1800 can also be connected to a ticket printer 2009 which can print tickets (cashless vouchers). When the player cashes out on the machine (indicated to the machine that the player wishes to cash out and terminate by typically by pressing a button), a ticket is printed by the ticket printer 2009 which carries the amount of credits left on the machine. This ticket can then be used to play other machines in the casino by inserting them into that machine's payment validator. The ticket can also be used to redeem for cash by inserting it into a ticket redemption machine (kiosk) which receives a ticket, validates it (typically by scanning the barcode), and then dispenses an identical amount of cash to what the ticket's value is.

While one processing unit is shown, it can be appreciated that one or more such processor can be programmed and work together (either in a same physical location or in different locations) to combine to implement any of the methods described herein. Programs and/or data required to implement any of the methods/features described herein can all be stored on any non-transitory computer readable storage medium (volatile or non-volatile, such as CD-ROM, RAM, ROM, EPROM, microprocessor cache, etc.)

Figure 21:
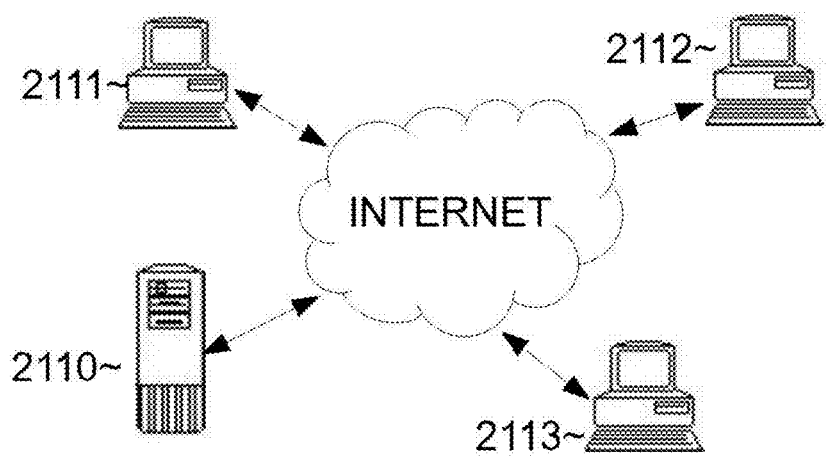
FIG. 21 is a network diagram showing a network structure for an online casino and players, according to an embodiment.

FIG. 21 is a network diagram showing a network structure for an online casino and players, according to an embodiment. The online casino which awards and stores credits (redeemable for cash) can also be accomplished by the system illustrated in FIG. 20.

A computer communications network (such as the Internet) can be used to connect a casino server 2110 which can host and serve an online casino. Note that while FIG. 21 shows only one server as the casino server 2110, the casino server 2110 can encompass numerous servers all cooperating with each other (whether in the same physical location or not). The casino server 2110 communicates with player devices 2111, 2112, 2113 through the Internet (or other computer communication network) and can implement any of the methods herein by executing computer code programmed accordingly. The devices 2111, 2112, 2113 can be any computing devices, such as a tablet, cell phone, personal computer, laptop, etc.

Figure 22:
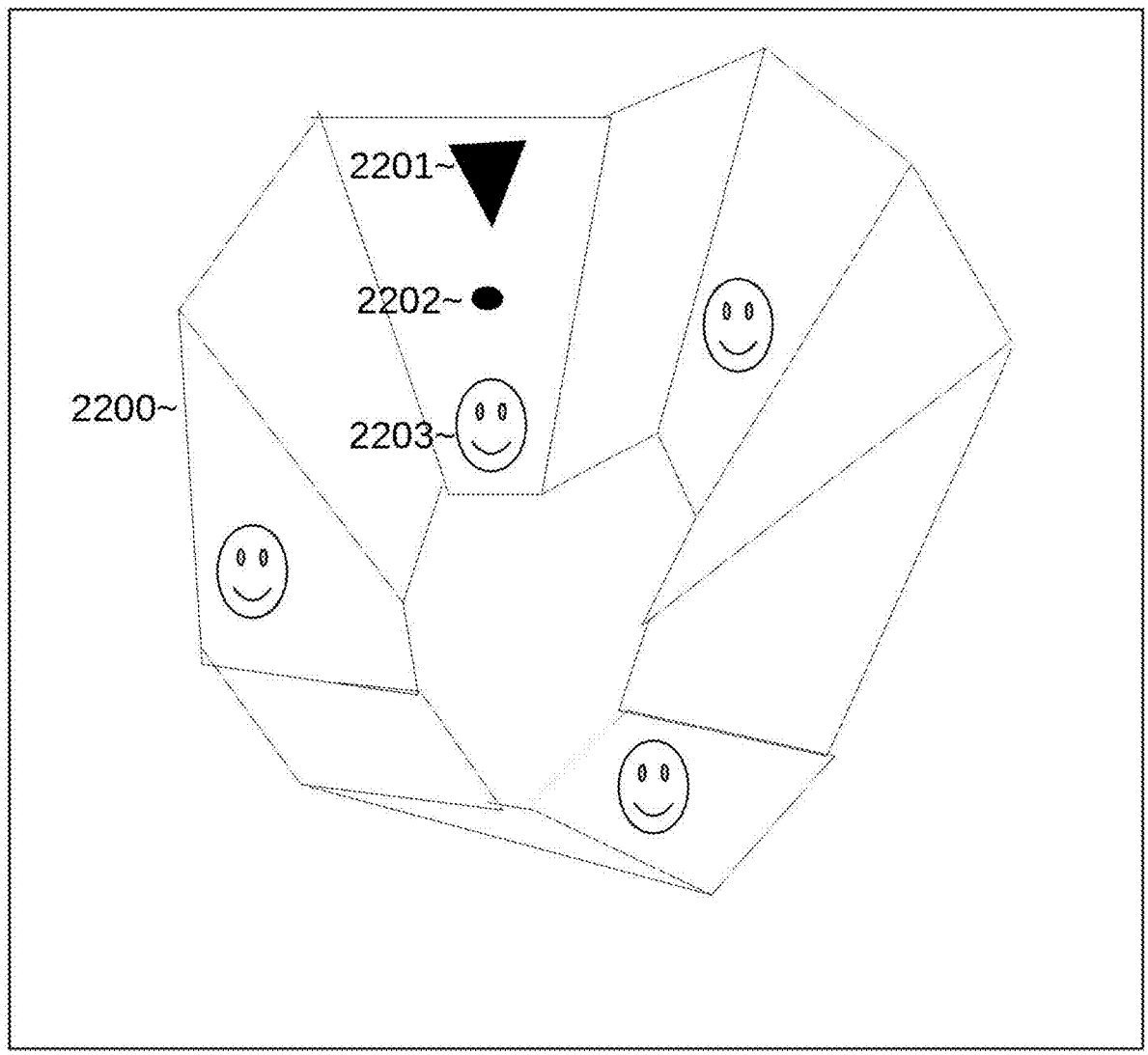
FIG. 22 is a drawing showing a three-dimensional shooter type of game, according to an embodiment.
Figure 23:
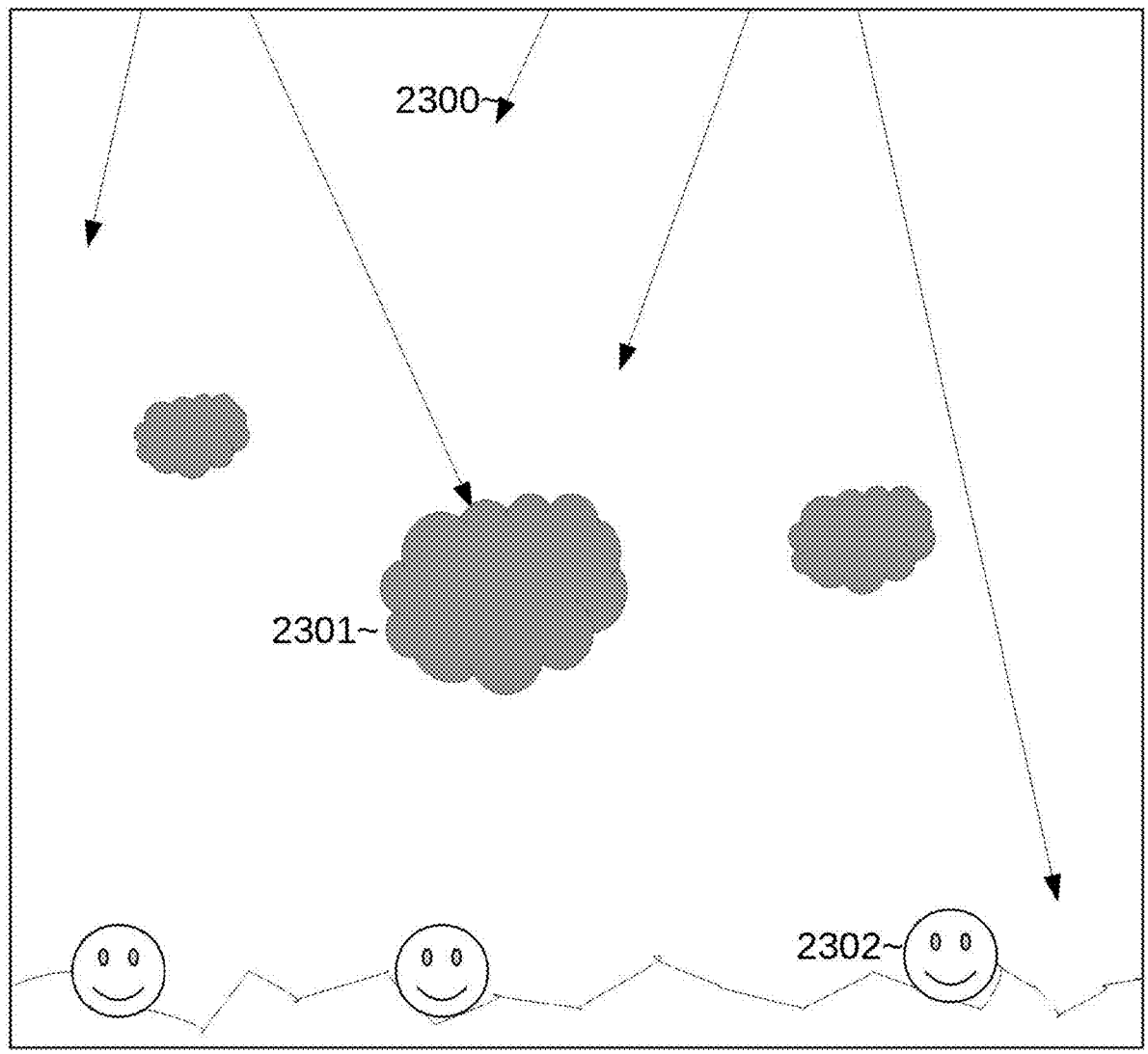
FIG. 23 is a drawing showing a missile-destroy type of game, according to an embodiment.

As stated previously, all of the above embodiments can be applied to any type of game as well, whether known or not. FIGS. 22-23 illustrate some known games that the embodiments/features described herein (in any combination) can be applied to.

FIG. 22 is a drawing showing a three-dimensional shooter type of game, according to an embodiment.

Shown is a (visual) three-dimensional continuous playing field 2200 which is a connection of two-dimensional planes. The player controls his/her ship 2201 by using physical controls (e.g., a rotating knob, buttons, etc.). The player can rotate his/her ship 2201 360 degrees (throughout all of the planes) and be back where the ship 2201 had started from. The player can also shoot missiles 2202 (or other projectiles) in the current plane that the ship 2201 is located in and the missile 2202 will only travel down that plane (but will not cross into another plane). The goal is for the player to shoot targets 2203 (shown as smiley-faces in FIG. 22) with the missiles 2202. The player can be given a finite (e.g., three) number of ships 2201 that once all of the ships 2201 are destroyed the game is over. In another embodiment, the planes are not all continuously connected in a loop but instead there are two outer (terminal) planes not connected to each other. Any of the features (in any combination) described herein with respect to any type of game can be applied to this type of game as well.

FIG. 23 is a drawing showing a missile-destroy type of game, according to an embodiment.

In this type of game, missiles 2300 (five such missiles are shown) fall from top to bottom. The player's goal is to defend the player's territory (or other item) 2302 which is depicted as smiley-faces in FIG. 23. The player can deploy missiles which explode into clouds 2301 (three clouds are shown). If the end (arrowhead) of each missile 2300 falls through a cloud then that missile will be destroyed and no longer poses a threat to the player's territory. The clouds will gradually expand but then disappear. Thus, the player will try to deploy the missiles (which turn into clouds) in strategic locations to destroy the downward falling missiles 2300 before the missiles 2300 strike the player's territory 2302. If the player loses (has destroyed by missiles 2300) all of his/her territories 2302, then the game will be over. Any of the features (in any combination) described herein with respect to any type of game can be applied to this type of game as well.

Note that in addition to the game types described herein (e.g., brick breaker, boulder destroy, shooter, balloon popping), one of ordinary skill will readily appreciate how to apply the methods/features described herein to other types of game as well, including the other game types herein. For example, though the skill factor computation involving "streak" was described in the context of a brick-breaker game or a shooter game, it can be appreciated how such a technique would also apply to a boulder-shooting game, as well as many other game types involving shooting projectiles at targets.

All components herein can be distributed across different such components as needed. For example, a single server as mentioned herein can be distributed across numerous different servers and locations. A processor (or processing unit) can also be distributed across multiple processors in a same or different computer (at a same or different location). The electronic components described herein represent one configuration but it can be appreciated that the computer systems implementing the methods herein can be more numerous and interconnected than illustrated herein.

Note that all flowcharts and descriptions of how methods are performed are not required to be performed exactly as described and/or illustrated. Other alternative methods, sequences, orders of operations, etc., can be utilized as long as a result is the same as illustrated and described. The flowcharts may illustrate one logical example of how a result can be obtained, but the programming of the software to implement the methods does not require that the logic/ operations of the flowchart be implemented exactly as set forth herein. Note that all features described herein can be combined without limitation regardless of the type of game being implemented, etc.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus to implement a video game, comprising:
    an electronic output device;
    an electronic input device comprising a joystick;
    an electronic storage device storing non-transitive computer readable instructions;
    at least one electronic processor connected to the electronic output device and the electronic input device, the at least one electronic processor configured to read and execute the computer readable instructions from the electronic storage device, the computer readable instructions programmed to cause the at least one electronic processor to:
    display on the electronic output device a set of objects, each object in the set of objects having a color;
    receive a shot from a player of a launched object by utilizing the joystick to control a direction of a launcher which the launched object launches out of;
    upon the launched object forming a group with objects in the set of objects, the group including only at least N adjacent like colored objects, wherein N being predetermined and is at least three, then removing all objects in the group from being displayed;
    determine which remaining objects in the set of objects are drops, drops being a group of suspended objects, and display on the output device the drops being dropped;
    determine a skill factor based on a number of drops;
    determine an applied award model utilizing the skill factor and determining an award utilizing the applied award model; and
    displaying on the electronic output device a credit meter showing a current amount of credits which is increased by the award.

2. The apparatus as recited in claim 1, wherein the computer readable instructions are further programmed such that when the shot is a bank shot, the skill factor is increased.

3. The apparatus as recited in claim 1, wherein the computer readable instructions are further programmed such that when the group comprises a special object, the skill factor is increased, wherein at least one object in the group but not all objects in the group are special objects.

4. The apparatus as recited in claim 1, wherein the computer readable instructions are further programmed such that a plurality of potential award models are provided, and the applied award model is determined via utilizing a mapping of skill factor values to respective award models out of the plurality of potential award models.

5. The apparatus as recited in claim 4, wherein the computer readable instructions are further programmed such that a first award model is mapped to a first skill factor and a second award model is mapped to a second skill factor which is greater than the first skill factor, wherein a return to player of the second award model is greater than a return to player of the first award model.

6. The apparatus as recited in claim 1, wherein the computer readable instructions are further programmed such that the video game is a balloon popping game.

7. The apparatus as recited in claim 1, wherein the computer readable instructions are further programmed to display a score meter and update a score upon the group being formed, wherein the score does not affect the current amount of credits and cannot be redeemed for value.

8. A method of playing a video game, comprising:
providing an electronic output device, an electronic input device, an electronic storage device storing non-transitive computer readable instructions, and at least one electronic processor connected to the electronic output device and the electronic input device and the electronic storage device, the electronic input device comprising a joystick;
executing, by the at least one electronic processor, the non-transitive computer readable instructions which are read from the electronic storage device, which cause the at least one electronic processor to perform:
displaying on the electronic output device a set of objects, each object in the set of objects having a color;
receiving a shot from a player of a launched object by utilizing the joystick which controls a direction of a launcher which the launched object launches out of, the launched object forming a group with objects in the set of objects, the group including only at least N adjacent like colored objects, wherein N being predetermined and is at least three;
removing all objects in the group from being displayed;
determining which remaining objects in the set of objects are drops, drops being a group of suspended objects, and displaying on the output device the drops dropping;
determining a skill factor based on a number of drops;
determining an applied award model utilizing the skill factor and determining an award utilizing the applied award model; and
displaying on the electronic output device a credit meter showing a current amount of credits which is increased by the award.

9. The method as recited in claim 8, wherein the shot is a bank shot and in response the skill factor is increased.

10. The method as recited in claim 8, wherein the group comprises a special object and in response the skill factor is increased, wherein at least one object in the group but not all objects in the group are special objects.

11. The method as recited in claim 8, wherein a plurality of potential award models are provided, and the determining the applied award model utilizes a mapping of skill factor values to respective award models out of the plurality of potential award models.

12. The method as recited in claim 11, wherein a first award model is mapped to a first skill factor and a second award model is mapped to a second skill factor which is greater than the first skill factor, wherein a return to player of the second award model is greater than a return to player of the first award model.

13. The method as recited in claim 8, wherein the video game is a balloon popping game.

14. The method as recited in claim 8, wherein the at least one electronic processor further performs displaying a score and updating the score upon the group being formed, wherein the score does not affect the current amount of credits and cannot be redeemed for value.

\* \* \* \* \*